(12) United States Patent
Qiao et al.

(10) Patent No.: US 11,876,602 B2
(45) Date of Patent: Jan. 16, 2024

(54) COMMUNICATION METHOD, APPARATUS, AND SYSTEM BASED ON SATELLITE NETWORK

(71) Applicant: HUAWEI TECHNOLOGIES CO., LTD., Guangdong (CN)

(72) Inventors: Yunfei Qiao, Hangzhou (CN); Rongdao Yu, Shenzhen (CN); Yinggang Du, Shenzhen (CN); Bin Wang, Hangzhou (CN); Tianxiang Wang, Shenzhen (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 470 days.

(21) Appl. No.: 17/239,117

(22) Filed: Apr. 23, 2021

(65) Prior Publication Data

US 2021/0242934 A1 Aug. 5, 2021

Related U.S. Application Data

(63) Continuation of application No. PCT/CN2019/110378, filed on Oct. 10, 2019.

(30) Foreign Application Priority Data

Oct. 25, 2018 (CN) .......................... 201811249213.2

(51) Int. Cl.
*H04W 4/029* (2018.01)
*H04B 7/185* (2006.01)
*H04W 72/12* (2023.01)

(52) U.S. Cl.
CPC ..... *H04B 7/18539* (2013.01); *H04B 7/18513* (2013.01); *H04W 4/029* (2018.02); *H04W 72/12* (2013.01)

(58) Field of Classification Search
CPC ... H04W 64/00; H04W 84/06; H04W 72/046; H04W 72/543; H04W 76/27; H04W 76/34; H04B 7/185
See application file for complete search history.

(56) References Cited

U.S. PATENT DOCUMENTS 5,810,297 A * 9/1998 Basuthakur ............ B64G 1/244
701/13
6,341,249 B1 * 1/2002 Xing ...................... B64G 1/369
701/13

(Continued)

FOREIGN PATENT DOCUMENTS

CN         1805593 A       7/2006
CN       102036228 A       4/2011
(Continued)

OTHER PUBLICATIONS

3GPP TS 29.163 V13.3.0 (Sep. 2015), 3rd Generation Partnership Project; Technical Specification Group Core Network and Terminals; Interworking between the IP Multimedia (IM) Core Network (CN) subsystem and Circuit Switched (CS) networks(Release 13), 356 pages.

(Continued)

*Primary Examiner* — Julio R Perez
(74) *Attorney, Agent, or Firm* — WOMBLE BOND DICKINSON (US) LLP

(57) ABSTRACT

The application provides a communication method, an apparatus, and a system that are used in a satellite network. A user terminal receives, on a management channel, a sounding signal sent by a management satellite. The management satellite manages one or more serving satellites. The user terminal sends a respiratory signal to the management satellite. The respiratory signal carries information about the user terminal. The information about the user terminal is used to determine information about a serving satellite that (Continued)

serves the user terminal. The management satellite or a ground station may uniformly schedule the serving satellite to serve the user terminal. When the serving satellite is switched, a negotiation between satellites may be omitted.

20 Claims, 17 Drawing Sheets

(56) References Cited

U.S. PATENT DOCUMENTS

| | | | | |
|---|---|---|---|---|
| 7,831,202 | B2* | 11/2010 | Karabinis | H04B 7/18532 343/705 |
| 8,538,323 | B2* | 9/2013 | Dankberg | H04B 7/18515 370/316 |
| 8,712,321 | B1* | 4/2014 | Dankberg | H04B 7/2041 455/12.1 |
| 9,841,506 | B2* | 12/2017 | Brosius | G01S 5/0036 |
| 10,244,453 | B2* | 3/2019 | Ashrafi | H04B 7/195 |
| 10,673,527 | B2* | 6/2020 | Laurent | H04B 7/18513 |
| 10,917,166 | B2* | 2/2021 | Gaske | H04B 7/18541 |
| 11,637,628 | B2* | 4/2023 | Greenidge | H04B 7/18584 370/316 |
| 11,737,043 | B2* | 8/2023 | Muhammad | H04W 56/005 455/12.1 |
| 2001/0048672 | A1* | 12/2001 | Okunishi | H04H 20/74 370/316 |
| 2017/0064347 | A1 | 3/2017 | Cassanova | |
| 2017/0207997 | A1 | 7/2017 | Martin et al. | |
| 2021/0036768 | A1* | 2/2021 | Keshet | H04B 7/2041 |
| 2021/0242934 | A1* | 8/2021 | Qiao | H04B 7/185 |
| 2022/0416880 | A1* | 12/2022 | Song | H04B 7/18513 |

FOREIGN PATENT DOCUMENTS

| | | |
|---|---|---|
| CN | 102122171 A | 7/2011 |
| CN | 103650559 A | 3/2014 |
| CN | 103945379 A | 7/2014 |
| CN | 104219718 A | 12/2014 |
| CN | 104580430 A | 4/2015 |
| CN | 105723776 A | 6/2016 |
| CN | 105790824 A | 7/2016 |
| CN | 105812046 A | 7/2016 |
| CN | 105872993 A | 8/2016 |
| CN | 106572506 A | 4/2017 |
| CN | 107683499 A | 2/2018 |
| CN | 107734590 A | 2/2018 |
| CN | 108089216 A | 5/2018 |
| CN | 108112281 A | 6/2018 |
| CN | 108141277 A | 6/2018 |
| CN | 108574968 A | 9/2018 |
| IN | 107231183 A | 10/2017 |
| WO | 0126251 A2 | 4/2001 |

OTHER PUBLICATIONS

Zhang Xuebei, A Design and Impelementation of Mobility Management in LEO Satellite Networks, Beijing University of Posts and Telecommunications, 2018, Issue 03, 2 Pages (abstract).

* cited by examiner

COMMUNICATION METHOD, APPARATUS, AND SYSTEM BASED ON SATELLITE NETWORK

CROSS-REFERENCE TO RELATED APPLICATIONS

This application is a continuation of International Application No. PCT/CN2019/110378, filed on Oct. 10, 2019, which claims priority to Chinese Patent Application No. 201811249213.2, filed on Oct. 25, 2018. The disclosures of the aforementioned applications are hereby incorporated by reference in their entireties.

TECHNICAL FIELD

Embodiments of the disclosure relate to the field of satellite communication, and more specifically, to a communication method, an apparatus, and a system based on a satellite network.

BACKGROUND

With the rapid development of communications technologies, people have increasingly higher requirements on indicators such as efficiency, mobility, and diversity of communications technologies. Currently, an important development direction in the communication field is global mobile communication, and satellite communication is an important part of global mobile communication. A satellite communication network features long communication distance, large coverage, and flexible networking. In some important fields, such as space communication, aeronautical communication, and military communication, the satellite communication technology plays an irreplaceable role. The satellite network can provide services for fixed terminals, and also provide services for various mobile terminals.

A satellite communication system can be classified into a geostationary earth orbit (GEO) satellite system and a non-geostationary earth orbit (NGEO) satellite system based on an altitude of an orbit where the satellite providing services is located, and the non-geostationary earth orbit satellite system may be further classified into a medium earth orbit (MEO) satellite system and a low earth orbit (LEO) satellite system. The low earth orbit satellite has become a hot spot in the global communication field due to its low orbit height and short propagation delay. The orbit height of the low earth orbit satellite system is about 500 km to 1000 km. A single satellite covers a small area of the ground and moves at a high speed (e.g., about 25000 km/h) relative to the ground. The average coverage time is only several minutes. For example, when the orbit height is 1000 km, an average coverage time for a low earth orbit satellite system with a minimum elevation angle of 10 degrees is about 6 minutes.

Because the satellite moves at a high speed, the satellite that serves a user terminal may be frequently switched. If a switching solution similar to that in a cellular network is used in satellite communication, the user terminal needs to report measurement results of channel quality of a current cell and a neighboring cell to an original satellite based on configuration signaling of the original satellite, and the original satellite determines, according to a satellite switching algorithm of the original satellite, whether satellite switching needs to be performed. If satellite switching needs to be performed, the original satellite initiates a switching request to a target satellite. When the target satellite allows access of the user terminal, the target satellite allocates new cell resources such as a time domain resource, a frequency domain resource, a code domain resource, and a baseband processing resource to the user terminal, and sends switching acknowledgment information to the original satellite; and an RRC connection between the user terminal and the target satellite is re-configured. The target satellite then reports a path switching request to a gateway, and waits for the gateway to feed back acknowledgment information of the path switching request. In addition, signaling operations such as user context release need to be performed between the target satellite and a source satellite.

For a communication network that includes only low earth orbit satellites in the space segment, when the low earth orbit satellites move at a high speed relative to the ground and the coverage time is only several minutes, the user terminal frequently performs switching between the satellites, and a plurality of times of switching between the satellites may be required in one communication process. During each switching, signaling such as a switching request between the source satellite and the target satellite and a path switching request between the target satellite and the gateway may be initiated in a negotiation process between the satellites. In this case, network control plane load is increased and problems such as huge data buffer and data forwarding load are caused.

SUMMARY

The application provides a communication method, an apparatus, and a system that are used in a satellite network, to reduce signaling caused by satellite switching during satellite communication, reduce network control plane load, and reduce data buffer and data forwarding load.

In an embodiment, a satellite communication method is provided A user terminal receives, on a management channel, a sounding signal sent by a management satellite, where the management satellite manages one or more serving satellites; and the user terminal sends a respiratory signal to the management satellite, where the respiratory signal carries information about the user terminal, and the information about the user terminal is used to determine information about a serving satellite that serves the user terminal.

In an embodiment, a set of areas covered by the one or more serving satellites managed by the management satellite form a hyper cell. In an embodiment, areas covered by several management beams that are transmitted by the management satellite form a hyper cell. In an embodiment, a set of areas covered by a plurality of management satellites form a hyper cell. In an embodiment, a set of areas covered by a plurality of serving satellites managed by a plurality of management satellites form a hyper cell.

In an embodiment, the user terminal has a unique user identifier in the hyper cell, and the information about the user terminal includes the user identifier.

In an embodiment, the hyper cell has a hyper cell identifier, and the user identifier is determined based on the hyper cell identifier and a device identifier of the user terminal.

In an embodiment, the user terminal receives resource scheduling information sent by the management satellite, where the resource scheduling information includes the information about the serving satellite that serves the user terminal.

In an embodiment, after the management satellite receives the respiratory signal sent by the user terminal, if the user terminal has a communication service requirement, the user terminal sends a communication request signal to the management satellite.

In an embodiment, the user terminal obtains location information of the user terminal, where the information about the user terminal includes the location information.

In an embodiment, after the user terminal sends the respiratory signal to the management satellite, the user terminal establishes a radio resource control (RRC) connection to the serving satellite, and the user terminal receives and sends communication service data.

In an embodiment, a user terminal receives, on a management channel, a sounding signal sent by a management satellite, where the management satellite also has a function of a serving satellite; and the user terminal sends a respiratory signal to the management satellite, where the respiratory signal carries information about the user terminal, and the information about the user terminal is used to determine information about the management satellite that serves the user terminal.

In an embodiment, areas covered by several management beams that are transmitted by the management satellite form a hyper cell. In an embodiment, a set of areas covered by a plurality of management satellites form a hyper cell.

In an embodiment, the user terminal has a unique user identifier in the hyper cell, and the information about the user terminal includes the user identifier.

In an embodiment, the hyper cell has a hyper cell identifier, and the user identifier is determined based on the hyper cell identifier and a device identifier of the user terminal.

In an embodiment, the user terminal receives resource scheduling information sent by the management satellite, where the resource scheduling information includes information about a serving satellite that serves the user terminal.

In an embodiment, after the management satellite receives the respiratory signal sent by the user terminal, if the user terminal has a communication service requirement, the user terminal sends a communication request signal to the management satellite.

In an embodiment, the user terminal obtains location information of the user terminal, where the information about the user terminal includes the location information.

In an embodiment, after the user terminal sends the respiratory signal to the management satellite, the user terminal establishes a radio resource control (RRC) connection to the management satellite, and the user terminal receives and sends communication service data.

In an embodiment, a satellite communication method is provided. A management satellite sends, on a management channel, a sounding signal to a user terminal, where the management satellite manages one or more serving satellites; and the management satellite receives a respiratory signal sent by the user terminal, where the respiratory signal carries information about the user terminal, and the information about the user terminal is used to determine information about a serving satellite that serves the user terminal.

In an embodiment, a set of areas covered by the one or more serving satellites managed by the management satellite form a hyper cell. In an embodiment, areas covered by several management beams that are transmitted by the management satellite form a hyper cell. In an embodiment, a set of areas covered by a plurality of management satellites form a hyper cell. In an embodiment, a set of areas covered by a plurality of serving satellites managed by a plurality of management satellites form a hyper cell.

In an embodiment, the user terminal has a unique user identifier in the hyper cell, and the information about the user terminal includes the user identifier.

In an embodiment, the hyper cell has a hyper cell identifier, and the user identifier is determined based on the hyper cell identifier and a device identifier of the user terminal.

In an embodiment, after the management satellite receives the respiratory signal sent by the user terminal, the management satellite receives a communication request signal sent by the user terminal.

In an embodiment, the management satellite determines resource scheduling information, where the resource scheduling information includes the information about the serving satellite that serves the user terminal. In an embodiment, the management satellite determines the resource scheduling information after completing resource scheduling decision on the serving satellite.

In an embodiment, the management satellite receives the resource scheduling information sent by a ground station, where the resource scheduling information includes the information about the serving satellite that serves the user terminal. In an embodiment, the ground station determines the resource scheduling information after completing resource scheduling decision on the serving satellite.

In an embodiment, the management satellite sends the resource scheduling information to the serving satellite; or the management satellite sends the resource scheduling information to a target serving satellite and an original serving satellite when the serving satellite is switched; or the management satellite may send the resource scheduling information to the user terminal; or the management satellite may send the resource scheduling information to a target management satellite when the serving satellite is switched.

In an embodiment, the management satellite releases communication resources, and the communication resources are used to implement service communication of the user terminal.

In an embodiment, the management satellite sends, to the ground station, the respiratory signal received by the management satellite.

In an embodiment, after the management satellite receives the respiratory signal sent by the user terminal, the management satellite sends, to the ground station, the communication request signal received by the management satellite.

In an embodiment, the management satellite receives first service data sent by the serving satellite, where the first service data includes data obtained after the serving satellite performs radio frequency signal processing on communication data from the user terminal.

In an embodiment, the management satellite sends second service data to the serving satellite, where the second service data includes data obtained after the management satellite performs baseband signal processing on the first service data.

In an embodiment, a user terminal is provided, including:
a receiving module, configured to receive a sounding signal sent by a management satellite on a management channel, where the management satellite manages one or more serving satellites; and a sending module, configured to send a respiratory signal to the management satellite, where the respiratory signal carries information about the user terminal, and the information about the user terminal is used to determine information about a serving satellite that serves the user terminal.

In an embodiment, a set of areas covered by the one or more serving satellites managed by the management satellite form a hyper cell; areas covered by several management beams that are transmitted by the management satellite form a hyper cell; a set of areas covered by a plurality of management satellites form a hyper cell; or a set of areas covered by a plurality of serving satellites managed by a plurality of management satellites form a hyper cell, where the hyper cell has a hyper cell identifier.

In an embodiment, the user terminal further includes a generation module, configured to generate a unique user identifier in the hyper cell, and the information about the user terminal includes the user identifier.

In an embodiment, the generation module is configured to generate the user identifier by using the hyper cell identifier and a device identifier of the user terminal.

In an embodiment, the receiving module is further configured to receive resource scheduling information sent by the management satellite, where the resource scheduling information includes the information about the serving satellite that serves the user terminal.

In an embodiment, the user terminal further includes an obtaining module, configured to obtain location information of the user terminal, where the information about the user terminal includes the location information.

In an embodiment, the sending module is further configured to send a communication request signal to the management satellite.

In an embodiment, the user terminal further includes a communications module, configured to establish a radio resource control (RRC) connection to the serving satellite, to implement service communication between the user terminal and the serving satellite.

In an embodiment, a management satellite is provided. The management satellite manages one or more serving satellites, and the management satellite includes: a sending module, configured to send, on a management channel, a sounding signal to a user terminal; and a receiving module, configured to receive a respiratory signal sent by the user terminal, where the respiratory signal carries information about the user terminal, and the information about the user terminal is used to determine information about a serving satellite that serves the user terminal.

In an embodiment, a set of areas covered by the one or more serving satellites managed by the management satellite form a hyper cell; areas covered by a plurality of management beams that are transmitted by the management satellite form a hyper cell; a set of areas covered by a plurality of management satellites form a hyper cell; or a set of areas covered by a plurality of serving satellites managed by a plurality of management satellites form a hyper cell.

In an embodiment, the user terminal has a unique user identifier in the hyper cell, and the information about the user terminal includes the user identifier.

In an embodiment, the hyper cell has a hyper cell identifier, and the user identifier is determined based on the hyper cell identifier and a device identifier of the user terminal.

In an embodiment, the management satellite further includes a determining module, configured to determine resource scheduling information based on the information about the user terminal, where the resource scheduling information includes the information about the serving satellite that serves the user terminal.

In an embodiment, the receiving module is further configured to receive the resource scheduling information sent by a ground station.

In an embodiment, the sending module is further configured to send the resource scheduling information to the serving satellite; send the resource scheduling information to a target serving satellite and an original serving satellite when the serving satellite is switched; send the resource scheduling information to the user terminal; or send the resource scheduling information to a target management satellite when the serving satellite is switched.

In an embodiment, the sending module is further configured to send, to the ground station, the respiratory signal received from the user terminal.

In an embodiment, the receiving module is further configured to receive first service data sent by the serving satellite, where the first service data includes data obtained after the serving satellite performs radio frequency signal processing on communication data from the user terminal.

In an embodiment, the sending module is configured to send a second service data to the serving satellite, where the second service data includes data obtained after the management satellite performs baseband signal processing on the first service data.

In an embodiment, the management satellite further includes a release module, where the release module is configured to release resources after sending a scheduling result to the target management satellite.

In an embodiment, the sending module is further configured to: after the management satellite receives a communication request signal sent by the user terminal, send the communication request signal to the ground station for processing.

In an embodiment, the management satellite further includes a communications module, configured to establish a radio resource control (RRC) connection to the serving satellite.

In an embodiment, a user terminal is provided, including:
  a memory, configured to store computer program instructions; and a processor, configured to execute the program instructions stored in the memory. The processor is connected to the memory. When the user terminal runs, the processor executes the computer program instructions stored in the memory, so that the user terminal performs the satellite communication methods as described herein.

In an embodiment, the user terminal further includes a transceiver. The processor executes the computer program instructions stored in the memory, so that the transceiver of the user terminal performs the satellite communication methods as described herein.

In an embodiment, a management satellite is provided, including:
  a memory, configured to store computer program instructions; and a processor, configured to execute the program instructions stored in the memory. The processor is connected to the memory. When the management satellite runs, the processor executes the computer program instructions stored in the memory, so that the management satellite performs the satellite communication methods as described herein.

In an embodiment, a computer-readable storage medium is provided. The computer-readable storage medium stores instructions, and when the instructions are run on a computer, the computer is enabled to perform the satellite communication methods as described herein.

In an embodiment, a computer-readable storage medium is provided. The computer-readable storage medium stores instructions, and when the instructions are run on a computer, the computer is enabled to perform the satellite communication methods as described herein.

In an embodiment, a computer program product including instructions is provided. When the computer program product runs on a computer, the computer is enabled to perform the satellite communication methods as described herein.

In an embodiment, a computer program product including instructions is provided. When the computer program product runs on a computer, the computer is enabled to perform the satellite communication methods as described herein.

In an embodiment, a satellite communication system is provided. The satellite communication system includes: the user terminal, and the management satellite according as described herein.

In an embodiment, a satellite communication method is provided. The method includes:
- a management satellite sends, on a management channel, a sounding signal to a user terminal, where the management satellite manages one or more serving satellites;
- the user terminal receives, on the management channel, the sounding signal sent by the management satellite;
- the user terminal sends, on the management channel, a respiratory signal to the management satellite, where the respiratory signal carries information about the user terminal, and the information about the user terminal is used to determine information about a serving satellite that serves the user terminal; and
- the management satellite receives, on the management channel, the respiratory signal sent by the user terminal.

In an embodiment, a set of areas covered by the one or more serving satellites managed by the management satellite form a hyper cell. In an embodiment, areas covered by several management beams that are transmitted by the management satellite form a hyper cell. In an embodiment, a set of areas covered by a plurality of management satellites form a hyper cell. In an embodiment, a set of areas covered by a plurality of serving satellites managed by a plurality of management satellites form a hyper cell.

In an embodiment, the user terminal has a unique user identifier in the hyper cell, and the information about the user terminal includes the user identifier.

In an embodiment, the hyper cell has a hyper cell identifier, and the user identifier is determined based on the hyper cell identifier and a device identifier of the user terminal.

In an, the management satellite sends, to a ground station, the respiratory signal received by the management satellite.

In an embodiment, if the user terminal has a communication service requirement, the user terminal sends a communication request signal to the management satellite.

In an embodiment, if the user terminal has a communication service requirement, the management satellite sends, to the ground station, the communication request signal collected by the management satellite.

In an embodiment, the user terminal receives resource scheduling information sent by the management satellite, where the resource scheduling information includes the information about the serving satellite that serves the user terminal.

In an embodiment, the management satellite receives resource scheduling information sent by the ground station, where the ground station completes resource scheduling decision of the serving satellite, and the resource scheduling information includes the information about the serving satellite that serves the user terminal.

In an embodiment, the management satellite sends the resource scheduling information to the serving satellite; or the management satellite sends the resource scheduling information to a target serving satellite and an original serving satellite when the serving satellite is switched; or the management satellite may send the resource scheduling information to the user terminal; or the management satellite may send the resource scheduling information to a target management satellite when the serving satellite is switched.

In an embodiment: the user terminal establishes a radio resource control (RRC) connection to the management satellite. In an embodiment, the method further includes: The user terminal receives communication service data from the serving satellite, and sends the communication service data to the serving satellite.

When the serving satellite is switched, because the user terminal keeps performing operations such as receiving the sounding signal of the management satellite and sending the respiratory signal of the user terminal, the management satellite or the ground station may uniformly schedule the serving satellite to serve the user terminal. A negotiation between serving satellites may be omitted, so that signaling overheads are reduced. A new serving satellite is directly scheduled to provide a service based on a user status and satellite resources that are learned by the management satellite or the ground station, to reduce a phenomenon that communication is unstable or even communication is interrupted due to satellite switching, and enable satellite communication of the user terminal smoother.

BRIEF DESCRIPTION OF DRAWINGS

To describe the technical solutions in the embodiments of the disclosure more clearly, the following briefly describes the accompanying drawings used for the descriptions of the embodiments.

DESCRIPTION OF EMBODIMENTS

To make the objectives, technical solutions, and advantages of the embodiments of the application more comprehensible, the following clearly describes the technical solutions in the embodiments of the application with reference to the accompanying drawings in the embodiments of the application.

Figure 1:
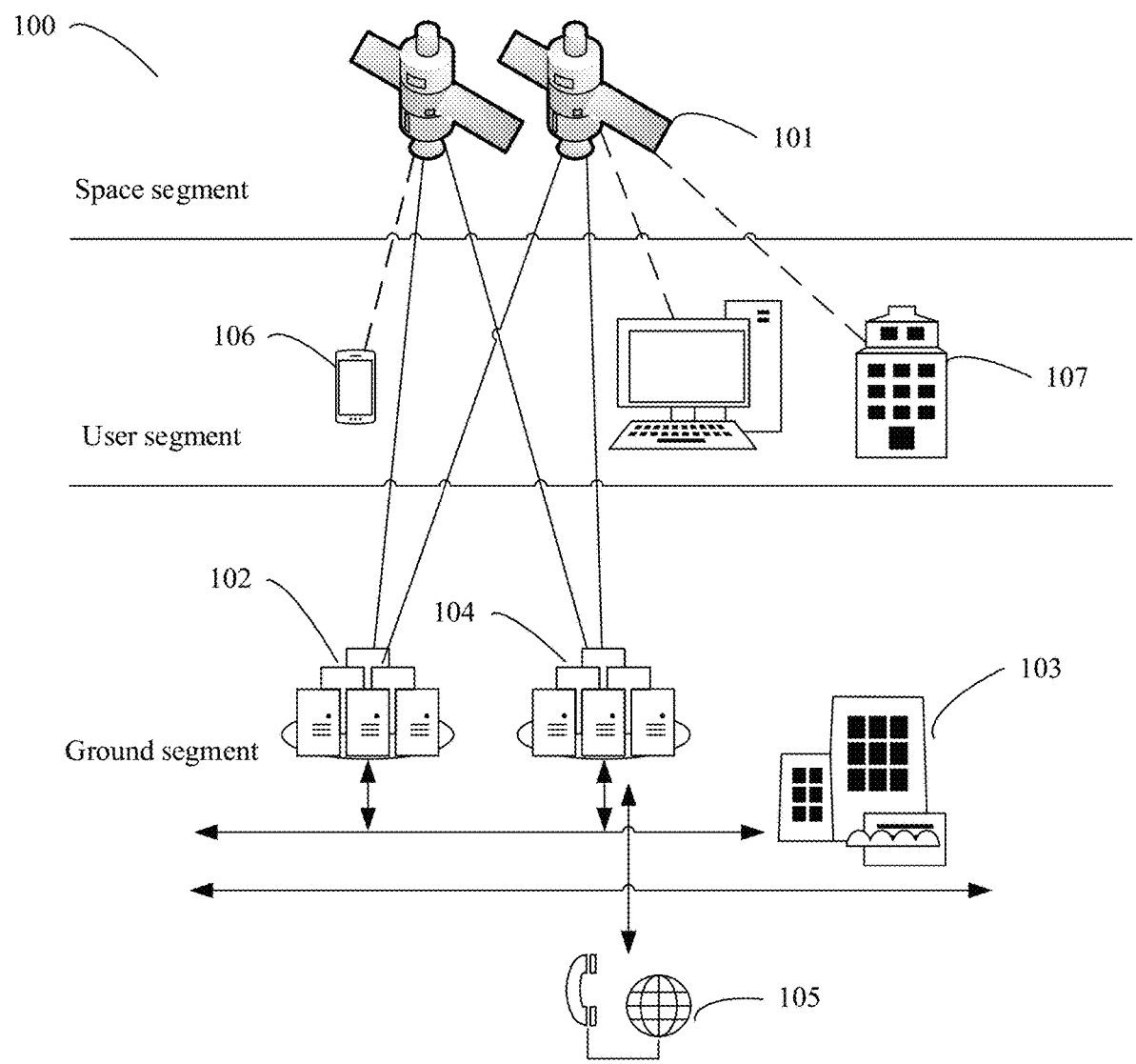
FIG. 1 is a schematic structural diagram of a satellite communication system according to one embodiment.

FIG. 1 is a schematic structural diagram of a satellite communication system according to one embodiment. The satellite communication system 100 generally includes three segments: a space segment, a ground segment and a user segment. The space segment may include GEO satellites, NGEO satellites, or a satellite network 101 consisting of a plurality of GEO satellites and NGEO satellites. The ground segment generally includes a satellite control center 102, a network control center (NCC) 103, and various gateway stations (or referred to as gateways) 104. The network control center (NCC) is also referred to as a system control center (SCC). The user segment consists of various user terminals, which may be various mobile terminals 106, for example, mobile satellite phones, or may be various fixed terminals 107, for example, communication ground stations. In FIG. 1, a dashed line indicates a communications signal between a satellite and a terminal, a solid line indicates a communications signal between a satellite and a device that is in the ground segment, and a double-headed arrow line indicates a communications signal between network elements in the ground segment.

The satellite control center 102 in the ground segment is responsible for functions such as maintaining, monitoring, and controlling an orbital position and a posture of the satellite, and managing an ephemeris of the satellite. The network control center 103 is responsible for processing user registration, identity confirmation, charging, and another network management function. The network control center and the satellite control center are integrated in some satellite mobile communications systems. The gateway 104 is responsible for functions such as call processing and switching, and interfacing with a ground communications network. The ground communications network 105 is a part of the ground segment of the satellite network, in which a data packet of the satellite is switched to a core network and sent to an end user terminal. The ground communications network may be a public switched telephone network (PSTN), a public land mobile network (PLMN), or another dedicated network. Gateways are required to have different gateway functions in different ground communications networks.

Figure 2:
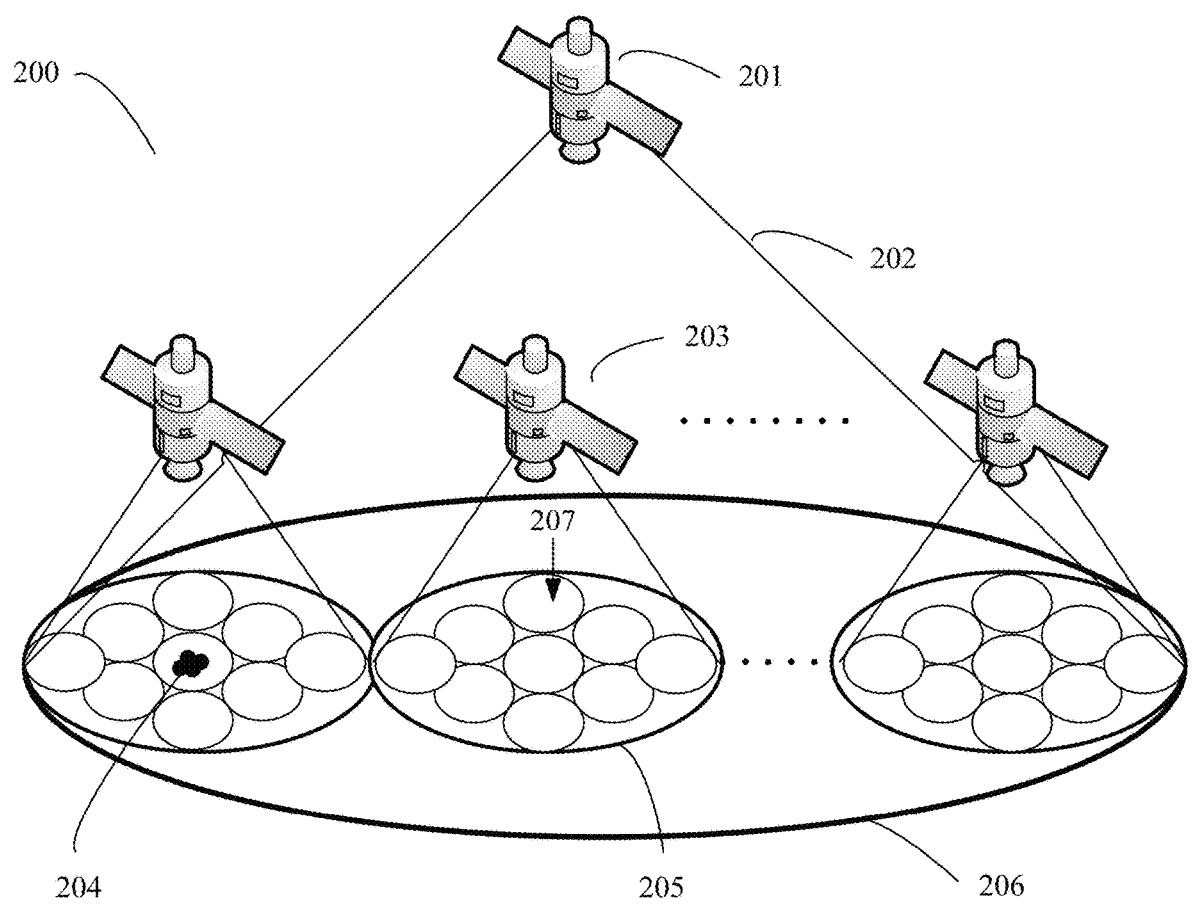
FIG. 2 is a basic architectural diagram of a satellite communication network with a multi-layer structure according to an embodiment of the application.

FIG. 2 is a basic architectural diagram of a satellite communication network with a multi-layer structure according to an embodiment of the application. As shown in FIG. 2, a space segment of the satellite communication network 200 with a multi-layer structure may generally include a management satellite 201 and one or more serving satellites 203. In an embodiment, if the network is a satellite communication network with a multi-layer structure in the networking, the space segment generally includes a plurality of management satellites and corresponding serving satellites managed by the management satellites.

In the application, for ease of description, the management satellite is referred to as a type-A satellite, and the serving satellite is referred to as a type-B satellite. The type-A satellite may be a high earth orbit satellite, and the type-B satellite may be a low earth orbit satellite. The high orbit and the low orbit are only relative concepts, and the type-A satellite and the type-B satellite do not specifically refer to satellites in a specific orbit. The following embodiments are merely examples for description. Details are not described again.

The type-A satellite and the type-B satellite may communicate with each other through an optical signal, a millimeter-wave signal, a terahertz signal, or the like. Certainly, a communication manner between the type-A satellite and the type-B satellite includes but is not limited to the foregoing manners, and the communication may further be performed through an electromagnetic signal in another frequency band.

The type-A satellite is used as the management satellite for managing the serving satellite. The type-B satellite is used as the serving satellite for providing a communication service for a user terminal 204. In an embodiment, the type-B satellite may be configured to send and receive a data signal of the user terminal, and perform service communication with the user terminal. For example, the type-B satellite processes a communication requirement of the user terminal, and is responsible for a communication service of a user terminal in a logical sub-cell 205 covered by the type-B satellite. If there is a type-A satellite in the satellite communication network, the type-B satellite can be managed and scheduled by the type-A satellite.

An antenna array of the type-B satellite forms a plurality of communication service beams 207, a set of areas covered by communication service beams of several type-B satellites form the virtual logical sub-cell 205, and the user terminal may learn information related to the type-B satellites in the virtual sub-cell.

Hyper cell 206: A set of areas covered by all type-B satellites managed or controlled by a same type-A satellite is referred to as a hyper cell. The hyper cell may also be defined as an area covered by management beams of the type-A satellite. In an embodiment, areas covered by several management beams 202 that are transmitted by the type-A satellite form a hyper cell, and the areas covered by the management beams also include one or more areas covered by one or more serving satellites. In the networking of the type-A satellites, a set of areas covered by a plurality of type-B satellites managed by a plurality of type-A satellites form a hyper cell, or a set of areas covered by a plurality of type-A satellites form a hyper cell.

Each hyper cell has a hyper cell identifier (or referred to as a hyper cell ID). The user terminal has a unique user identifier in each hyper cell. In an example, the user identifier may be determined by using the hyper cell ID and a device identifier (or referred to as a device ID) of the user terminal. In an embodiment, the user identifier may be generated by directly combining the hyper cell ID and the device ID, or the unique user identifier is generated in a manner such as calculation by a specified function. Certainly, the user identifier of the user terminal may also be generated in another manner. A manner of generating the user identifier is not limited in an embodiment of the application, provided that the user terminal can be identified in the hyper cell. Because a user identifier of any user terminal in the entire hyper cell is unique, even if the type-B satellite serving the user terminal is switched in the hyper cell, the switching is imperceptible to the user terminal.

The management beam 202 is a wide-coverage beam, and is used for sending and receiving, on an agreed physical resource, management information exchanged between all users and satellites within the coverage. The management information includes information exchanged between the user terminal and the satellite on a dedicated management beam, for example, a sounding signal, a respiratory signal, and scheduling signaling.

Baseband units and radio frequency units of the type-A satellite and the type-B satellite that process the management information and communication service data may be deployed in different modes. For example, the baseband unit and the radio frequency unit may be centrally deployed on a same satellite, or the baseband unit and the radio frequency unit may be separately deployed on the type-A satellite and the type-B satellite in a distributed manner. The following two tables list some deployment modes. Table 1 shows a deployment mode for processing management information, and Table 2 shows a deployment mode for processing communication service data, where sequence numbers each indicate a number of the deployment modes.

TABLE 1

Deployment mode of management information processing unit

| Number | Type-A satellite | Type-B satellite | Features of an application scenario |
|---|---|---|---|
| 1 | Radio frequency unit + baseband unit | Radio frequency unit + baseband unit | The type-B satellite can process the management information independently. The type-B satellite is used as a backup satellite. |
| 2 | Radio frequency unit + baseband unit | — | The type-A satellite processes the management information independently. |
| 3 | Baseband unit | Radio frequency unit | Distributed deployment of management information processing units. |
| 4 | Baseband unit | Radio frequency unit + baseband unit | The type-B satellite can process the management information independently. The type-B satellite is used as a backup satellite. |
| 5 | — | Radio frequency unit + baseband unit | The type-B satellite processes the management information independently. |

TABLE 2

Deployment mode of communication service data processing unit

| Number | Type-A satellite | Type-B satellite | Features of an application scenario |
|---|---|---|---|
| 1 | — | Radio frequency unit + baseband unit | The type-B satellite processes the communication service data independently. |
| 2 | Baseband unit | Radio frequency unit | Distributed deployment of service data processing units. |
| 3 | Radio frequency unit + baseband unit | Radio frequency unit + baseband unit | The type-A satellite can process the communication service data independently. The type-A satellite is used as a backup satellite. |
| 4 | Radio frequency unit + baseband unit | — | The type-A satellite processes the communication service data independently. |

In an actual application, a deployment mode is not limited to the deployment mode listed in the foregoing tables, and there may be another deployment mode. In addition, the deployment mode of the management information processing unit and the deployment mode of the communication service data processing unit do not affect each other, and are independent of each other. In addition, division into the radio frequency unit and the baseband unit herein is functional division of a hardware system or a chip system, but not division of a hardware structure. In an embodiment, on a satellite having both a radio frequency unit for processing the management information and a radio frequency unit for processing the communication service data, the radio frequency unit for processing the management information and the radio frequency unit for processing the communication service data may be implemented by a same hardware system or chip system. The same is also applicable to the baseband unit. Details are not described again.

In an example, the type-A satellite uses the number 2 deployment mode in Table 1, a baseband unit and a radio frequency unit that process the management information are deployed on the type-A satellite, and the management information may be directly sent to the type-A satellite for radio frequency signal processing and baseband signal processing. The type-B satellite uses the number 1 deployment mode in Table 2. A baseband unit and a radio frequency unit that process the communication service data are deployed on the type-B satellite, and the units are configured to perform radio frequency signal processing and baseband signal processing on the communication service data of the user terminal.

In an example, the type-A satellite uses the number 4 deployment mode in Table 1. Only a baseband unit that processes the management information is deployed on the type-A satellite, and a radio frequency unit that processes the management information is deployed on the type-B satellite. The management information is received by the type-B satellite, radio frequency signal processing is performed on the management information, and then the management information is sent to the type-A satellite for baseband signal processing. In the example, a baseband unit and a radio frequency unit that process the management information are deployed on the type-B satellite. In addition, the type-B satellite uses the number 1 deployment mode in Table 2, and a radio frequency unit and a baseband unit that process the communication service data are deployed on the type-B satellite. The radio frequency unit that processes the management information on the type-B satellite performs operations such as filtering, frequency conversion, amplification, and beamforming on the management information. In addition to data signal processing, the type-B satellite is also responsible for radio frequency signal processing on the management information.

In an example, the type-B satellite uses the number 2 deployment mode in Table 2. Only a radio frequency unit that processes the communication service data may be deployed on the type-B satellite, and a baseband unit that is responsible for processing the communication service data is deployed on the type-A satellite. In this case, the type-B satellite receives the communication data of the user terminal, obtains first service data after the communication data is processed by the radio frequency unit of the type-B satellite, and then sends the first service data to the type-A satellite for baseband signal processing; and the baseband unit of the type-A satellite processes the first service data, to obtain second service data.

The user terminal 204 needs to access the mobile satellite communication network through the ground segment of the satellite communication system to perform mobile communication. The user terminal in the embodiments of the application may be user equipment, an access terminal, a subscriber unit, a subscriber station, a mobile station, a mobile console, a remote station, a remote terminal, a mobile device, a user terminal, a terminal, a wireless communications device, a user agent, or a user apparatus. The terminal device may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device, a terminal device in a 5G network, a terminal device in a future evolved public land mobile network (PLMN) or another future communications system, or the like. This is not limited in the embodiments of the application. Mobile terminals represented by satellite phones and vehicle-mounted satellite systems can directly communicate with satellites. Fixed terminals represented by ground communications stations can communicate with satellites only after being relayed by ground stations. The user terminal sets and obtains a communication status by installing a wireless transceiver antenna, to complete communication.

In an embodiment, the satellite communication network includes: a type-A satellite, a type-B satellite, and a user terminal.

The type-A satellite may be a high earth orbit satellite, and more specifically, may be a GEO satellite. The type-A communications satellite deployed on the GEO orbit is stationary relative to the ground.

The type-B satellite may be a low earth orbit satellite, and more specifically, may be an LEO satellite. The type-B communications satellite deployed on the LEO orbit is fast-moving relative to the ground.

In an embodiment, only a baseband unit for performing baseband signal processing on the management information is loaded on the type-A satellite, and the type-A satellite performs operations such as baseband data processing and backhaul. The management information is sent to the type-A satellite for baseband signal processing after the type-B satellite performs radio frequency signal processing.

The type-B satellite in an embodiment may carry only a radio frequency unit, and the type-B satellite is responsible for performing operations such as filtering, frequency conversion, amplification, beamforming, and baseband data forwarding. In this case, the type-B satellite receives a data signal from the terminal and sends the data signal to the type-A satellite, and the type-A satellite is responsible for processing baseband data of a user service. In addition to data signal processing, because the type-A satellite that manages the type-B satellite is loaded with only a baseband unit, the type-A satellite also performs radio frequency signal processing on the management information.

Figure 3:
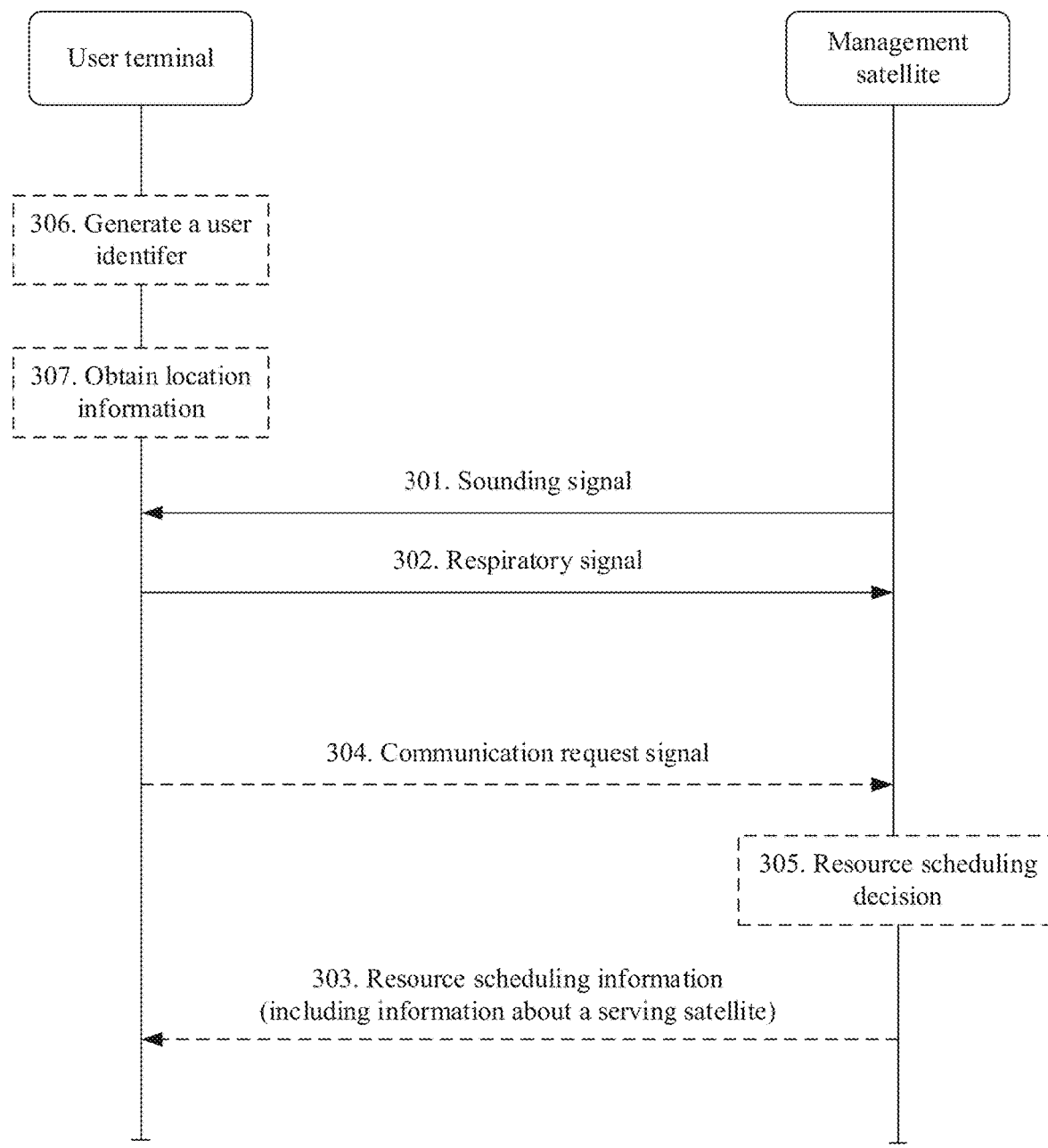
FIG. 3 is a basic schematic flowchart of a satellite communication method according to an embodiment of the application.

FIG. 3 is a basic schematic flowchart of a satellite communication method according to an embodiment of the application. The method includes the following operations.

301: A management satellite sends a sounding signal to a user terminal, and the user terminal receives the sounding signal sent by the management satellite on a management channel. The management satellite manages one or more serving satellites.

In the application, a hyper cell may be defined, and each hyper cell has a hyper cell identifier used to identify the hyper cell. There may be a plurality of definitions for a hyper cell. For example, a set of areas covered by one or more serving satellites managed by one management satellite form one hyper cell; areas covered by several management beams that are transmitted by one management satellite form a hyper cell; a set of areas covered by two or more management satellites form a hyper cell; or a set of areas covered by a plurality of serving satellites managed by two or more management satellites form a hyper cell.

The user terminal has a unique user identifier in the hyper cell. In an example, the user identifier may be determined based on the hyper cell identifier and a device identifier of the user terminal.

302: The user terminal sends a respiratory signal to the management satellite, and the management satellite receives the respiratory signal.

The respiratory signal sent by the user terminal may carry information about the user terminal. The information about the user terminal may be used to determine information about a serving satellite that serves the user terminal. The information about the user terminal may be information related to the user terminal, for example, the user identifier and/or location information.

In an embodiment, the satellite communication method may further include:

303: The management satellite sends resource scheduling information to the user terminal, and the user terminal receives the resource scheduling information sent by the management satellite. The resource scheduling information includes the information about the serving satellite that serves the user terminal. The information about the serving satellite is used to indicate the serving satellite that serves the user terminal, for example, information that can be used to identify the serving satellite, such as an identifier of the serving satellite.

In an embodiment, the satellite communication method may further include:

304: The user terminal sends a communication request signal to the management satellite, and the management satellite receives the communication request signal sent by the user terminal. The communication request signal indicates that the user terminal has data to be sent, and may also be referred to as a data sending request or a resource scheduling request.

In an embodiment, the satellite communication method may further include:

305: The management satellite performs resource scheduling decision, that is, the management satellite determines, based on the information about the user terminal, the information about the serving satellite that serves the terminal.

The management satellite may determine, with reference to related content such as the location information of the user terminal and ephemeris information of a satellite network, at least one serving satellite and at least one beam that serve the user terminal in this communication. In an embodiment, when the serving satellite that serves the user terminal needs to be switched, the management satellite may also determine, with reference to the related content such as the location information of the user terminal and the ephemeris information of the satellite network, another serving satellite and another beam that serve the user terminal in this communication. In an embodiment, operation 305 is an optional operation. The resource scheduling decision is not necessarily performed by the management satellite, and may alternatively be performed by a central node or a ground station. After determining the resource scheduling information, the central node or the ground station sends the resource scheduling information to the management satellite.

In an embodiment, the satellite communication method further includes:

306: The user terminal generates the user identifier.

The user terminal has a unique user identifier in the hyper cell. The user terminal may access a hyper cell for the first time. In this case, the user terminal may perform operation 306. In an embodiment, elements for generating the user identifier may include a hyper cell ID and a device ID. The user identifier in the hyper cell may be generated only when the user terminal accesses the hyper cell for the first time. If the user terminal has accessed the hyper cell and has a user identifier in the hyper cell, the operation of generating the user identifier may be omitted.

In an embodiment, the communication method may further include:

307: The user terminal obtains location information of the user terminal. The location of the user terminal may be obtained by the user terminal based on a global navigation satellite system or a baseband satellite-based observed time difference of arrival (OTDOA) positioning method. The information about the user terminal carried in the respiratory information may include user location information, that is, information indicating the location of the user terminal.

In an embodiment of the application, the serving satellite that serves the user terminal is managed by the management satellite. If the serving satellite that serves the terminal is switched, the management satellite determines the switched serving satellite, and the user terminal does not need to negotiate switching, so that signaling overheads can be reduced.

In an embodiment of the application and any one of the following embodiments of the application, a sequence of operations may be adjusted and new operations may be added based on a specific application scenario. There is no necessary execution sequence of the operations. This is not limited in an embodiment of the application.

Figure 4:
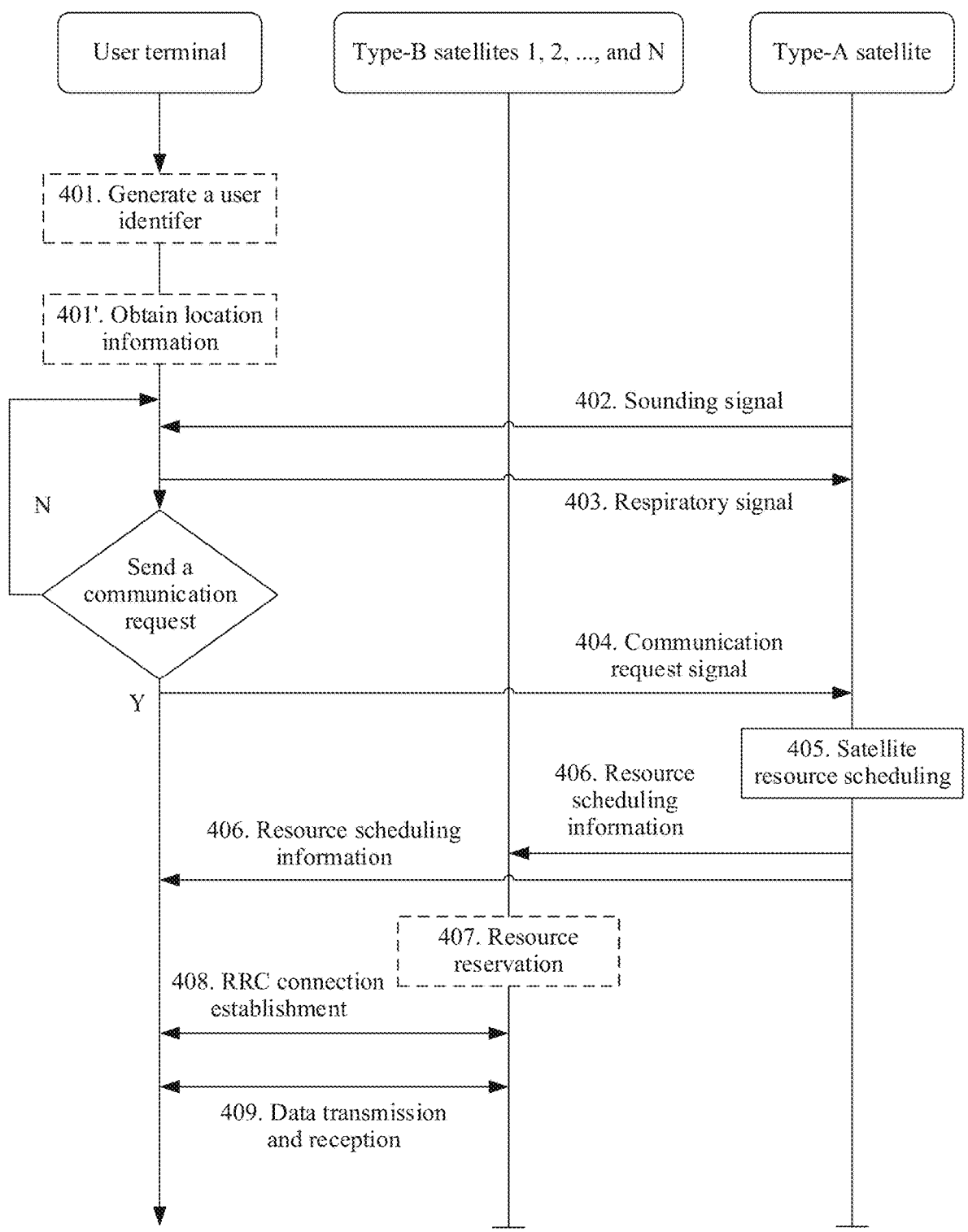
FIG. 4 is a schematic flowchart of a communication method in a satellite network according to an embodiment of the application.

FIG. 4 is a schematic flowchart of a communication method in a satellite network according to an embodiment of the application. The method is used in a satellite communication network architecture that includes a type-A satellite, a type-B satellite, and a user terminal. A radio frequency unit and a baseband unit that process management information are deployed on the type-A satellite, and a radio frequency unit and a baseband unit that process communication service data are deployed on the type-B satellite. Areas covered by management beams that are transmitted by one type-A satellite form a hyper cell, or a set of areas covered by all type-B satellites that are managed or controlled by the type-A satellite form a hyper cell. The method is applicable to a case in which a user terminal initially accesses a hyper cell. The method includes the following operations.

401: The user terminal generates a user identifier in one hyper cell. In an embodiment, elements for generating the user identifier may include a hyper cell identifier (ID) and a device ID. In an embodiment, the hyper cell ID is used to identify a hyper cell, and the device ID may be, for example, a device serial number of the user terminal.

The user identifier in the hyper cell may be generated only when the user terminal accesses the hyper cell for the first time. If the user terminal has accessed the hyper cell and has a user identifier in the hyper cell, the operation of generating the user identifier may be omitted.

In an embodiment, the user identifier may be unique in the hyper cell, and is generated by combining information such as the hyper cell ID and the device ID. A generation method includes but is not limited to the following methods: directly combining the hyper cell ID and the device ID, combining the hyper cell ID, the device ID, and other related information, or obtaining a unique user identifier through calculation by using a preset function relationship, or the like.

In an embodiment, the method may further include operation 401' in which the user terminal obtains location information of the user terminal. The location of the user terminal may be obtained by the user terminal based on a global navigation satellite system or a baseband satellite-based observed time difference of arrival (OTDOA) positioning method.

In an embodiment, a navigation satellite system refers to an airborne radio navigation and positioning system that can provide a user with all-weather three-dimensional coordinates and speed and time information at any place on the surface of the earth or in near-earth space. Common four satellite navigation systems include global positioning system (GPS), BeiDou Navigation Satellite System, China's beidou navigation satellite system (BDS), global navigation satellite system (GLONASS), and galileo satellite navigation system (GALILEO). In the OTDOA positioning method, a location of a terminal device is determined by detecting a time difference of arrival of signals from different base stations.

This operation does not limit a sequence of obtaining the user identifier and the location information. The user terminal may first obtain the generated unique user identifier, and then obtain the location information of the user terminal by using the method. It may be that the user terminal first obtains the location information of the user terminal by using the method, and then obtains the generated unique user identifier. Certainly, the user terminal may also obtain both the unique user identifier and the location information of the user terminal. This operation is applicable to subsequent embodiments.

402: The type-A satellite sends a sounding signal on a dedicated management channel, and the user terminal receives the sounding signal.

In an embodiment, the dedicated management channel may be a complete logical link agreed upon between the type-A satellite and the user terminal that is in a hyper cell managed by the type-A satellite. The logical link includes an agreed physical layer resource, a MAC layer resource, an upper-layer interface, and the like, and each protocol layer has corresponding resources.

The corresponding physical resources include but are not limited to a time domain resource, a frequency domain resource, and a code domain resource of the satellite communication network. A respiratory signal sent by the user terminal may include content such as the user identifier and the location information, and is sent in a periodic manner through system configuration or in an aperiodic manner through system scheduling.

There is no necessary execution sequence between operations in operation 401 (401') and operation 402. There may be the following solutions. This is not limited in an embodiment of the application.

In an embodiment, the user terminal may first detect the sounding signal sent by the type-A satellite on the agreed management channel, and then generate the user identifier and obtain the location information of the user terminal. Then, a corresponding physical resource is selected for sending the respiratory signal that includes content such as the user identifier and the location information.

In an embodiment, the user terminal may first generate the user identifier, then detect the sounding signal sent by the type-A satellite on the agreed management channel; and after detecting the sounding signal, the user terminal obtains the location information of the user terminal. Then, a corresponding physical resource is selected for sending the respiratory signal that includes content such as the user identifier and the location information.

In an embodiment, the user terminal may first obtain the location information of the user terminal, and then detect the sounding signal sent by the type-A satellite on the agreed management channel. After the sounding signal is detected, the user identifier is then generated. Then, a corresponding physical resource is selected for sending the respiratory signal that includes content such as the user identifier and the location information.

403: The user terminal sends the respiratory signal, and the type-A satellite receives the respiratory signal, where the respiratory information carries the user identifier and/or the location information of the user terminal, and the type-A satellite updates the content such as the user identifier and the location information of the user terminal in the hyper cell based on the respiratory signal. The user terminal may select an agreed physical resource to periodically or aperiodically send the respiratory signal. Correspondingly, the type-A satellite may detect the respiratory signal in a periodic manner through system configuration or in an aperiodic manner through system scheduling.

404: In an embodiment, when the user terminal has a communication service requirement, the user terminal sends a communication request signal on the management channel, and the type-A satellite receives the communication request signal.

405: After receiving the communication request signal, the type-A satellite determines, with reference to related content such as the location information of the user terminal and ephemeris information of a satellite network, at least one type-B satellite and at least one beam that serve the user terminal in this communication.

In an embodiment, the ephemeris information is information such as orbit information of the satellite, identity information, a communication capability of the satellite, and a security level. The information may be used as one of factors for determining the type-B satellite that serves the user terminal.

In an embodiment, when the type-B satellite that serves the user terminal needs to be switched, the type-A satellite may also determine, with reference to the related content such as the location information of the user terminal and the ephemeris information of the satellite network, a next type-B satellite and a next beam that serve the user terminal in this communication.

When determining the type-B satellite and the beam, the type-A satellite may allocate the type-B satellite and the beam to perform a communication service with reference to the location information of the user terminal and the ephemeris information such as an orbit of the type-B satellite and a communication capability that can be provided. The beam in operation 405 is a beam used by the type-B satellite to process communication service data.

In an embodiment, a method for determining the type-B satellite and the beam in operation 405 is provided. In the method, the type-B satellites within a range in which a location of a to-be-served user terminal is used as a center are first sorted based on a time length for covering the user terminal; then the type-B satellites that do not meet the communication security level, that do not have capabilities of serving the user terminal, or whose communication capabilities do not reach a predetermined level are removed; and the remaining satellites are sorted again based on a coverage time, and the type-B satellite and the beam that have a longest coverage time in the sorting are selected to serve the user terminal.

In an embodiment, a method for determining the type-B satellite and the beam in operation 405 is provided. In the method, the type-B satellites within a range in which a to-be-served user terminal is used as a center may be first sorted based on a time that can cover the user terminal; the type-B satellites that meet a requirement of the communication security level, that have capabilities of serving the user terminal, and whose service communication capabilities reach a predetermined level are selected; and the sorted type-B satellites are sorted again based on a coverage time, and the type-B satellite and the beam that are ranked at the top are selected to serve the user terminal.

It should be noted that the method for determining the type-B satellite and the beam is not limited to the foregoing method, and the foregoing method is merely an alternative method of operation 405. Any method obtained by using the foregoing method or by combining the foregoing operations may be considered as one of the methods disclosed in the embodiments of the application.

406: The type-A satellite notifies the corresponding type-B satellite and the user terminal of resource scheduling information through the management channel.

407: The user terminal performs data communication by using the allocated type-B satellite and beam, and the determined type-B satellite reserves resources for the user terminal.

408: The user terminal establishes an RRC connection to the type-B satellite.

409: The user terminal receives and sends communication service data to the type-B satellite.

410: In an embodiment, when a serving satellite is switched, communication resources of an original type-B satellite that serves the user terminal are released.

In a communication process, the user terminal and the type-A satellite continuously perform operations 402 to 404 until the entire communication ends.

Figure 5:
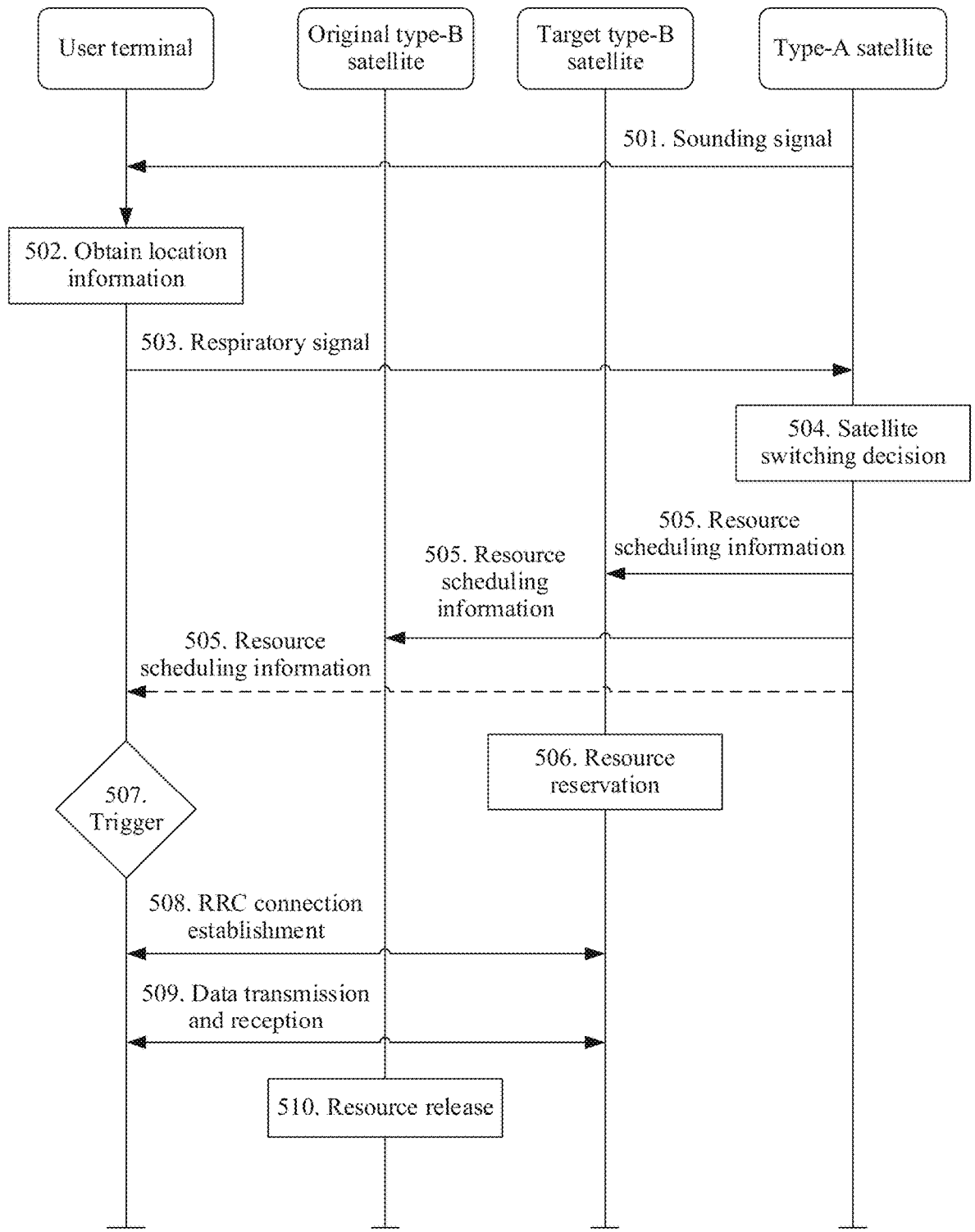
FIG. 5 is a schematic flowchart of a communication method for satellite switching in a satellite communication process according to one embodiment.

FIG. 5 is a schematic flowchart of a communication method for satellite switching in a satellite communication process according to one embodiment. A case in which a user terminal encounters type-B satellite switching in a service communication process is described. This procedure is basically the same as the procedure in FIG. 4, and a main difference lies in that resource scheduling decision is serving satellite switching decision. A type-A satellite sends resource scheduling information to an original type-B satellite and a target type-B satellite, the target type-B satellite reserves resources and establishes an RRC connection to the user terminal and transmits and receives data, and the original type-B satellite releases resources. In an embodiment, the type-A satellite may further send the resource scheduling information to the user terminal.

As shown in FIG. 5, a switching procedure includes the following operations.

501: The type-A satellite sends a sounding signal to the user terminal, and the user terminal receives the sounding signal sent by the type-A satellite on an agreed management channel.

502: The user terminal obtains location information of the user terminal.

503: The user terminal sends a respiratory signal to the type-A satellite, and the type-A satellite detects the respiratory signal. The user terminal may periodically or aperiodically send the respiratory signal, to prove that the user terminal is still in a current hyper cell, and receive a communication service of a type-B satellite in the hyper cell, where the respiratory signal may carry information such as a user identifier and/or the location information.

In a service communication process, the type-A satellite periodically or aperiodically detects the respiratory signal, and updates content such as the user identifier and the location information of the user terminal in the hyper cell based on the respiratory signal.

504: The type-A satellite performs switching decision. The type-A satellite determines, based on the content such as the user identifier, the location information, and ephemeris information of a currently serving type-B satellite, whether the user terminal exceeds a coverage area of the satellite. When a distance from the user terminal to an edge of the coverage area of the type-B satellite reaches a threshold or a service time of the type-B satellite reaches a threshold, the type-A satellite determines, based on the method for determining the type-B satellite and the beam that serve the user terminal in operation 405, a next type-B satellite and a next beam that serve the user terminal; and the type-A satellite performs baseband satellite switching decision based on the foregoing method.

505: After the type-A satellite determines the next type-B satellite and the beam that serve the user terminal, the type-A satellite notifies the target type-B satellite and the original type-B satellite of the resource scheduling information.

506: The target type-B satellite reserves resources for the user terminal.

507: Then, the original type-B satellite or the target type-B satellite triggers the user terminal, and indicates the terminal to establish a connection to the target type-B satellite.

508: The user terminal establishes an RRC connection to the target type-B satellite.

509: The user terminal receives and sends communication service data to the target type-B satellite, and the target type-B satellite starts to be responsible for a communication service of the user terminal.

510: Resources of the original type-B satellite are released.

In an embodiment, in operation 505, the type-A satellite notifies the target type-B satellite and the original type-B satellite of a scheduling result, and the type-A satellite may also notify the user terminal of the scheduling result; and the user terminal actively establishes the connection to the target type-B satellite and completes a subsequent operation.

If communications resources are independently managed by each satellite, a large amount of signaling is exchanged in a satellite negotiation process when a switching occurs. For example, signaling such as a switching request between an original satellite and a target satellite, admission control, uplink and downlink synchronization, and re-access, and signaling such as a path switching request and acknowledgment between a target satellite and a control gateway are initiated. In addition to generating large quantity of signaling overheads, a case in which all resources of the target satellite have been occupied and cannot be allocated to the user terminal for use may even occur, resulting in communication interruption.

In an embodiment of the application, when the type-B satellite is switched in the communication process, because of there is the dedicated management channel, the user terminal keeps performing operations such as receiving the sounding signal of the type-A satellite and sending the respiratory signal of the user terminal on the channel, and the type-A satellite can schedule the type-B satellite to serve the user terminal. Therefore, when the type-B satellite is switched, the type-A satellite may skip an operation of negotiation between the satellites, thereby reducing the signaling overheads. According to a user status and satellite resources learned by the type-A satellite, a new type-B satellite is directly scheduled to provide a service, and a negotiation process during satellite switching in the conventional technology is not required, so that the user terminal can perform smooth communication without perceiving the satellite switching process.

Figure 6:
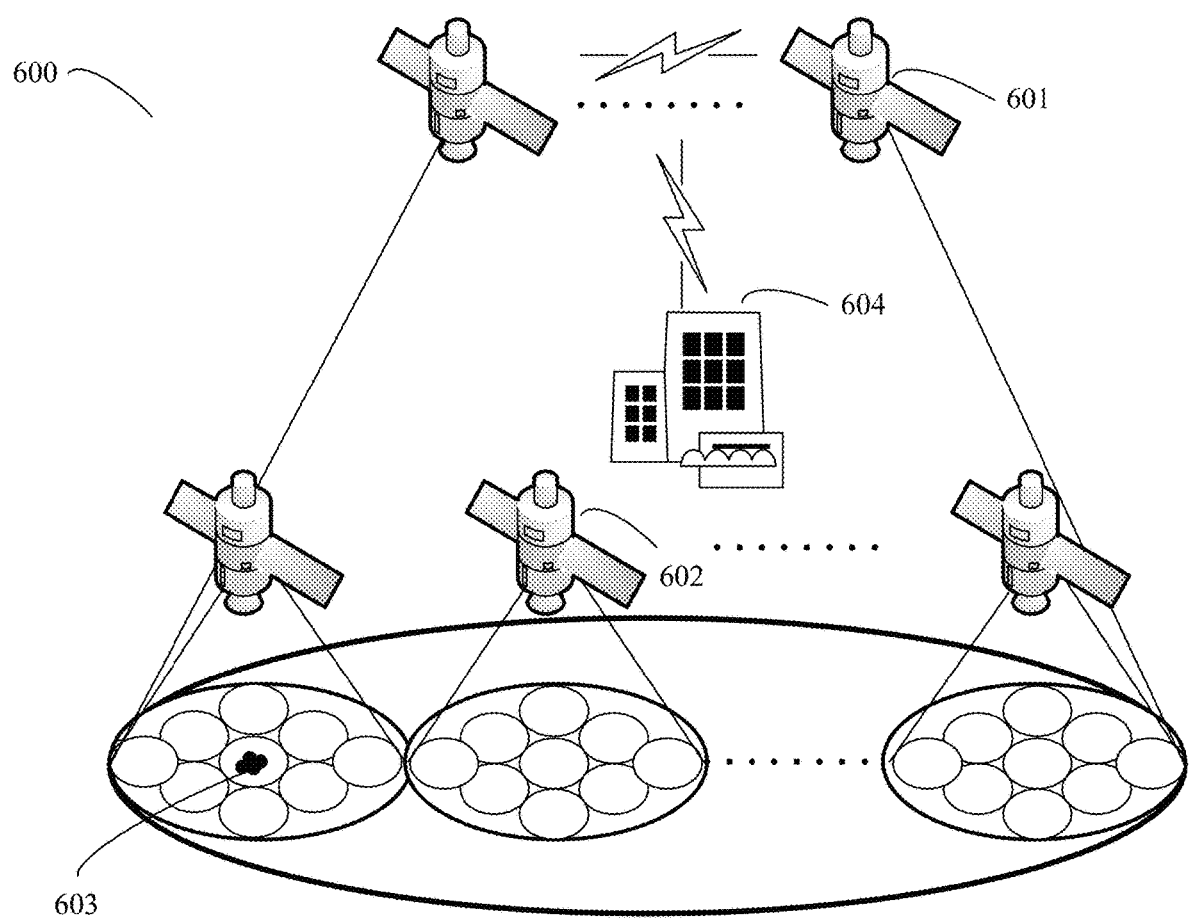
FIG. 6 is a schematic architectural diagram of a satellite communication network according to an embodiment of the application.

FIG. 6 is a schematic architectural diagram of a satellite communication network 600 according to an embodiment of the application. The satellite communication network includes two or more type-A satellites 601, a plurality of type-B satellites 602, a ground station 603, and a user terminal 604. Areas covered by management beams that are transmitted by the more than two type-A satellites form a hyper cell, or a set of areas covered by all type-B satellites that are managed or controlled by the more than two type-A satellites may form a hyper cell.

The satellite network includes the type-A satellites 601. In an embodiment of the application, the type-A communications satellite may be a GEO satellite that is in a static state relative to the ground, or may be a high earth orbit satellite that is not in a static state relative to the ground. A plurality of type-A satellites are in the networking and used to communicate with a ground station 603. The type-A satellite and the ground station exchange received management information, such as a respiratory signal, a sounding signal, and scheduling signaling. A radio frequency unit and a baseband unit that process management information are deployed on the type-A satellite.

In an embodiment, when the type-A satellite is a high earth orbit satellite that moves relative to the ground, a position of the type-A satellite relative to the ground changes, and a type-B satellite covered and managed by the type-A satellite changes; and information about type-B satellites managed by a plurality of type-A satellites in the networking can be transmitted through the ground station or transmitted between type-A satellites.

The satellite network includes the type-B satellites 602. The type-B satellite in an embodiment of the application has a general feature of the foregoing type-B satellite, and the type-B satellite has a radio frequency unit and a baseband unit that process communication service data.

The satellite network includes the ground station 603. The ground station is used as a management unit in an embodiment of the application, has a baseband unit used for baseband signal processing and a radio frequency unit used for radio frequency signal processing that are in a communications system, can exchange the management information with the type-A satellite, and has a powerful information processing capability. The ground station communicates with the plurality of the type-A satellites in the networking, and manages and schedules the type-B satellites in a unified manner.

The satellite network includes the user terminal 604. The user terminal in an embodiment of the application has a general feature of the foregoing user terminal.

Figure 7:
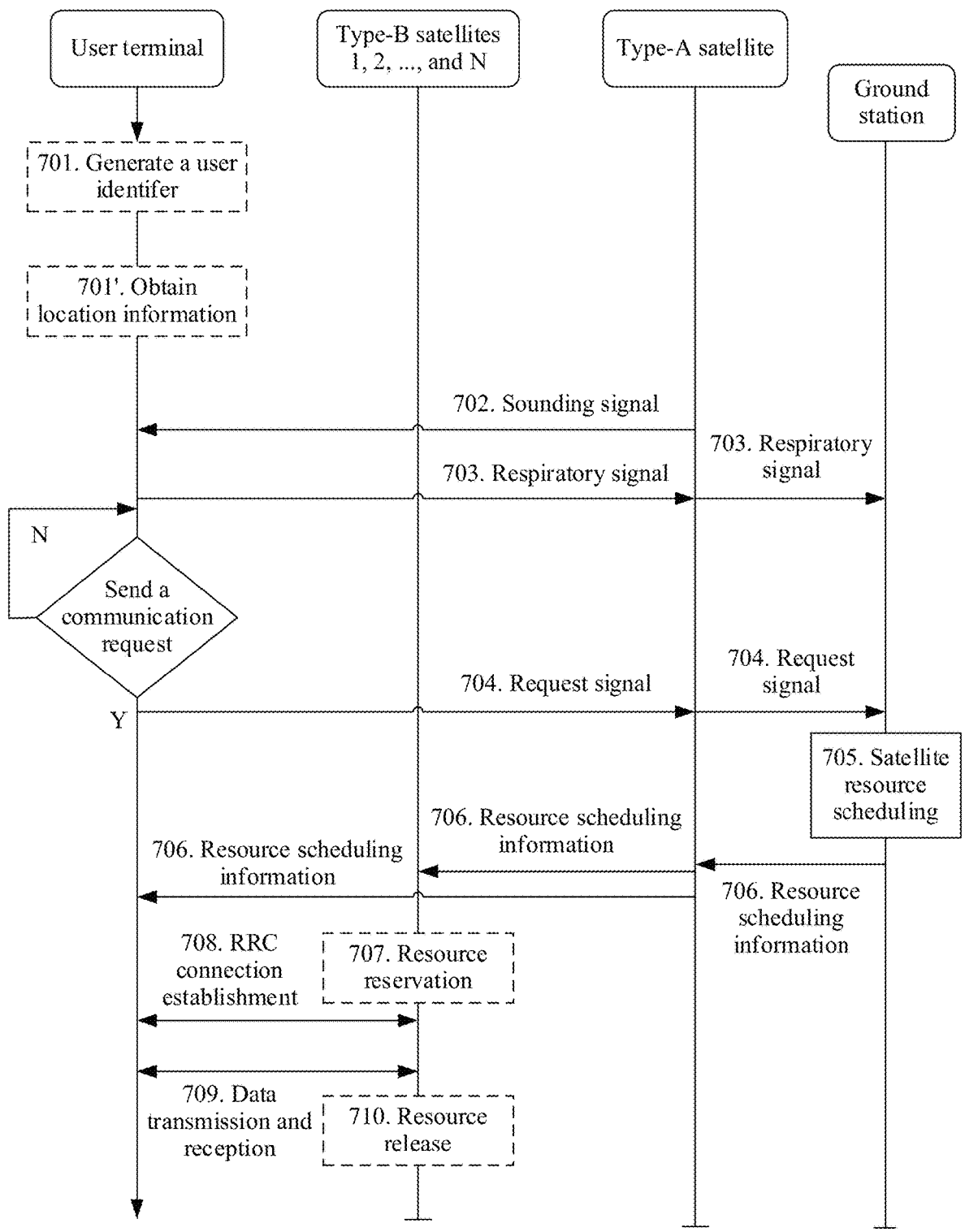
FIG. 7 is a schematic flowchart of a communication method in a satellite network according to an embodiment of the application.

FIG. 7 is a schematic flowchart of a communication method in a satellite network according to an embodiment of the application. The method may be used in the satellite communication network architecture as shown in FIG. 6. The method includes the following operations.

701: The user terminal in a hyper cell generates a user identifier, and the user identifier in the hyper cell may be generated only when the user terminal accesses the hyper cell for the first time. If the user terminal has accessed the hyper cell and has a user identifier in the hyper cell, the operation of generating the user identifier may be omitted.

In an embodiment, operation 701' is further included. The user terminal obtains location information of the user terminal. For a method for obtaining the user identifier and the location information, refer to operation 401 in the foregoing communication method in the satellite network. Details are not described herein again.

702: The type-A satellite sends a sounding signal on a dedicated management channel, the user terminal receives the sounding signal sent by the type-A satellite, and the type-A satellite selects a corresponding physical resource to send a respiratory signal at a predetermined time or as required. For this operation, refer to operation 402 in the foregoing communication method in the satellite network. Details are not described herein again.

It should be noted that there is no necessary execution sequence between operations in operation 701 (701') and operation 702. For details, refer to the solutions in the foregoing embodiments of the application. This is not limited in an embodiment of the application.

703: The user terminal sends the respiratory signal, and the type-A satellite receives the respiratory signal, where the respiratory information carries the user identifier and/or the location information of the user terminal. After receiving the respiratory signal, the type-A satellite transmits the respiratory signal to the ground station for unified processing, and the ground station updates content such as the identifier and the location information that are of the user terminal in the hyper cell based on the respiratory signal. The user terminal may select an agreed physical resource to periodically or aperiodically send the respiratory signal. Correspondingly, the type-A satellite may detect the respiratory signal in a periodic manner through system configuration or in an aperiodic manner through system scheduling.

The type-A satellite periodically or aperiodically transmits the respiratory signal of the user terminal in the hyper cell to the ground station for processing, and the ground station learns of the user identifier and the location information in the hyper cell, and updates the content such as the user identifier and the location information in the hyper cell based on the received respiratory signal. The ground station may send management information of the user terminal and management information of the type-B satellite to the type-A satellite in the system based on a requirement of the system.

In an embodiment, the type-A satellite in the networking detects the respiratory signal, and updates the content such as the user identifier and the location information based on the respiratory signal. The management information of the user terminal and the management information of the type-B satellite are transmitted between the type-A satellites in the networking through information sharing. In this manner, the ground station does not need to participate in the processing and transmission of the management information.

704: In an embodiment, when the user terminal has a communication service requirement, the user terminal sends a communication request signal on the management channel, and the type-A satellite transmits the communication request signal to the ground station for processing after receiving the communication request signal.

705: The ground station determines, with reference to the location information of the user terminal, the ephemeris information of the satellite network, and the like, at least one type-B satellite and at least one beam that serve the user terminal in this communication.

The type-A satellite may periodically or aperiodically detect the communication request signal.

In an embodiment, the ephemeris information is information such as orbit information of the satellite, identity information, a communication capability of the satellite, and a security level. The information may be used as one of factors for determining the type-B satellite that serves the user terminal.

In an embodiment, when the type-B satellite that serves the user terminal needs to be switched, the type-A satellite may also determine, with reference to the related content such as the location information of the user terminal and the ephemeris information of the satellite network, a next type-B satellite and a next beam that serve the user terminal in this communication.

When determining the type-B satellite and the beam, the ground station may allocate the type-B satellite and the beam to perform a communication service with reference to the location information of the user terminal and the ephemeris information such as an orbit of the type-B satellite and a communication capability that can be provided. The beam in operation 705 is a beam used by the type-B satellite for service data processing.

In an embodiment, a method for determining the type-B satellite and the beam in operation 705 is provided. The ground station may first sort the type-B satellites within a range in which a to-be-served user terminal is used as a center based on a time length for covering the user terminal; then the type-B satellites that do not meet the communication security level, that do not have capabilities of serving the user terminal, or whose communication capabilities do not reach a predetermined level are removed; and the remaining satellites are sorted again based on a coverage time, and the type-B satellite and the beam that have a longest coverage time in the sorting are selected to serve the user terminal.

In an embodiment, a method for determining the type-B satellite and the beam in operation 705 is provided. The ground station may first sort the type-B satellites within a range in which a to-be-served user terminal is used as a center based on a time that can cover the user terminal; the type-B satellites that meet a requirement of the communication security level, that have capabilities of serving the user terminal, and whose service communication capabilities reach a predetermined level are selected; and the sorted type-B satellites are sorted again based on a coverage time, and the type-B satellite and the beam that have a longest coverage time in the sorting are selected to serve the user terminal.

It should be noted that the method for determining the type-B satellite and the beam is not limited to the foregoing method, and the foregoing method is merely an alternative method of operation 705.

706: The ground station sends a scheduling result to the reported type-A satellite through the management channel, and the type-A satellite notifies the user terminal and a corresponding type-B satellite to prepare for communication.

707: In an embodiment, the user terminal performs data communication by using the allocated type-B satellite and beam, and the determined type-B satellite reserves resources for the user terminal.

708: The user terminal establishes an RRC connection to the type-B satellite.

709: The user terminal receives and sends communication service data to the type-B satellite.

710: In an embodiment, when a serving satellite is switched, communication resources of an original type-B satellite that serves the user terminal are released.

In a communication process, the user terminal and the type-A satellite continuously perform operations 702 to 704 until the entire communication ends.

A sequence of operations in an embodiment of the application may be adjusted and new operations may be added based on an application scenario. There is no necessary execution sequence of the operations. This is not limited in an embodiment of the application.

Figure 8:
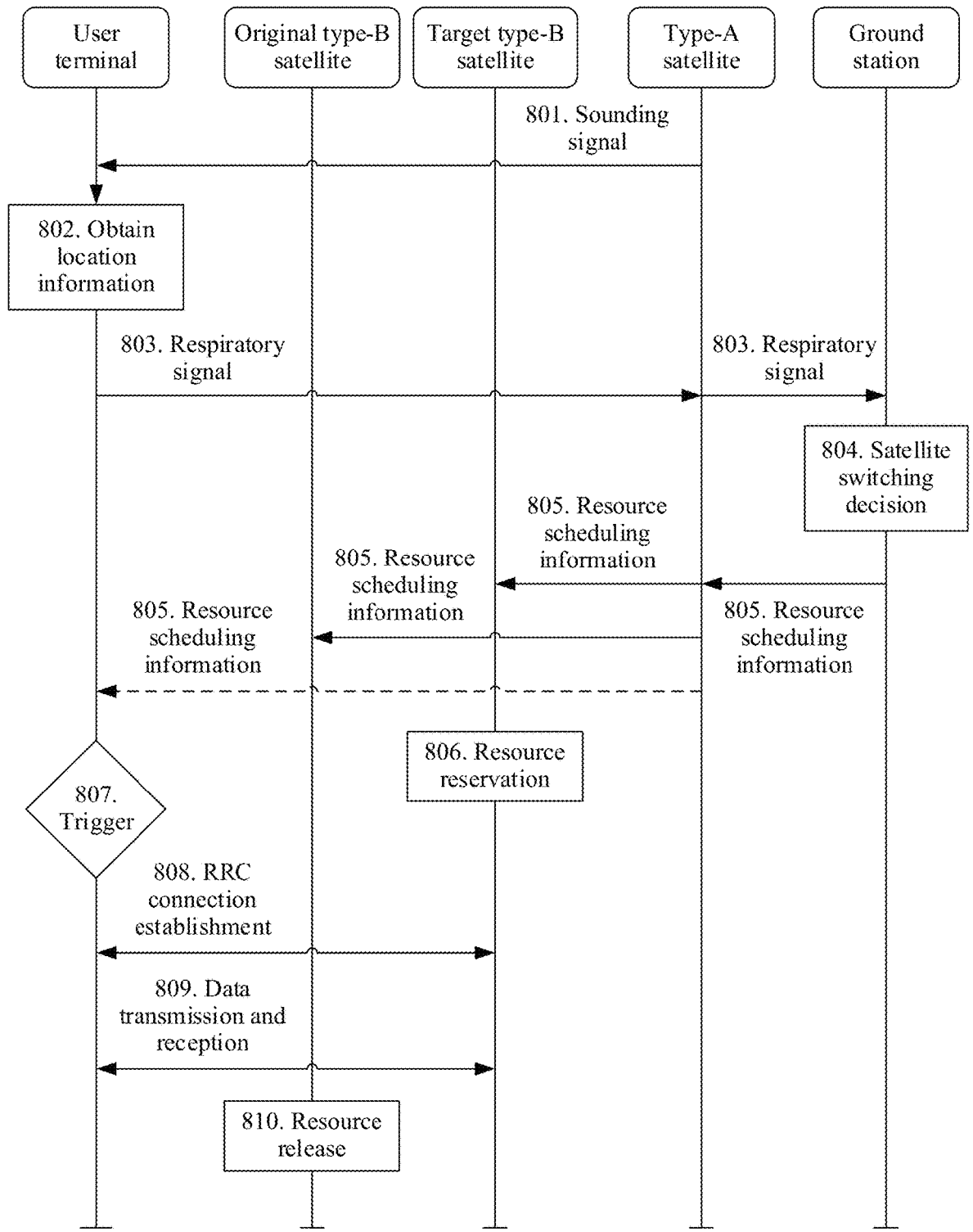
FIG. 8 is a schematic flowchart of a communication method for satellite switching in a satellite communication process according to one embodiment.

In an embodiment, the user terminal may encounter type-B satellite switching in a service communication process. FIG. 8 is a schematic flowchart of a communication method for satellite switching in a satellite communication process according to one embodiment.

A switching procedure includes the following operations.

801: A type-A satellite sends a sounding signal to a user terminal, and the user terminal receives the sounding signal sent by the type-A satellite on an agreed management channel.

802: The user terminal obtains location information of the user terminal.

803: The user terminal sends a respiratory signal to the type-A satellite, and the type-A satellite detects the respiratory signal. After receiving the respiratory signal, the type-A satellite transmits the respiratory signal to a ground station for unified processing, and the ground station updates content such as an identifier and the location information that are of the user terminal in the hyper cell based on the respiratory signal. The user terminal may periodically or aperiodically send the respiratory signal, to prove that the user terminal is still in a current hyper cell, and receive a communication service of a type-B satellite in the hyper cell, where the respiratory signal may carry information such as the user identifier and/or the location information.

804: The ground station performs switching decision. The ground station determines, based on content such as the identifier of the user terminal and the location information in the hyper cell, and ephemeris information of a current serving type-B satellite, whether the user terminal exceeds a coverage area of the satellite. When a distance from the user terminal to an edge of the coverage area of the type-B satellite reaches a threshold or a service time of the type-B satellite reaches a threshold, the ground station determines, based on the method for determining the type-B satellite and the beam that serve the user terminal in operation 705, a next type-B satellite and a next beam that serve the user terminal.

805: After the ground station determines the next type-B satellite and the beam that serve the user terminal, the ground station first sends resource scheduling information to the reported type-A satellite, and then the type-A satellite notifies a target type-B satellite and an original type-B satellite of a scheduling result,

806: The target type-B satellite reserves resources based on operation 707.

807: Then, the original type-B satellite or the target type-B satellite triggers the user terminal, and indicates the user terminal to establish a connection to the target type-B satellite.

808: The user terminal establishes an RRC connection to the target type-B satellite.

809: The user terminal receives and sends communication service data to the target type-B satellite, and the target type-B satellite starts to be responsible for a communication service of the user terminal.

810: Resources of the original type-B satellite are released.

In an embodiment, in operation 805, the type-A satellite notifies the target type-B satellite and the original type-B satellite of the scheduling result, and the type-A satellite may also notify the user terminal of the scheduling result; and the user terminal actively establishes the connection to the target type-B satellite and completes a subsequent operation.

Figure 9:
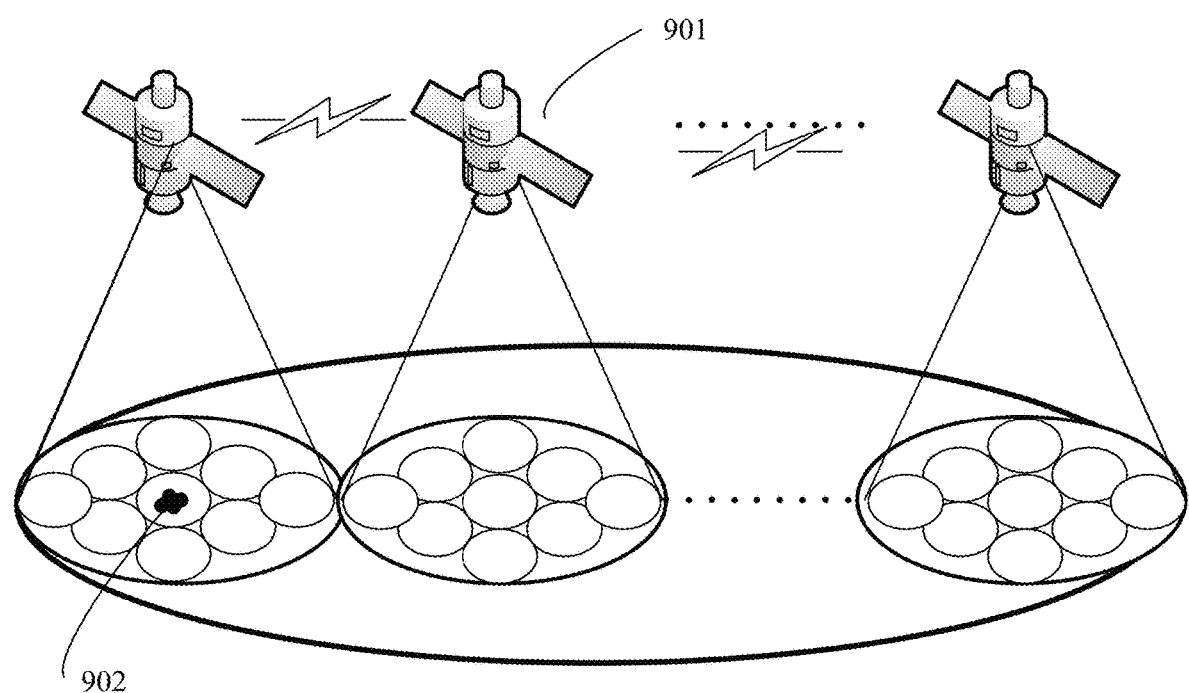
FIG. 9 is a schematic architectural diagram of a satellite communication network according to an embodiment of the application.

FIG. 9 is a schematic architectural diagram of a satellite communication network according to an embodiment of the application. The satellite communication network includes a plurality of type-A satellites 901 and a user terminal 902, but does not include a type-B satellite. The type-A satellite also has a service function of the type-B satellite, and a radio frequency unit and a baseband unit that process management information and a radio frequency unit and a baseband unit that process communication service data are deployed. Areas covered by the plurality of type-A satellites may form a hyper cell.

Figure 10:
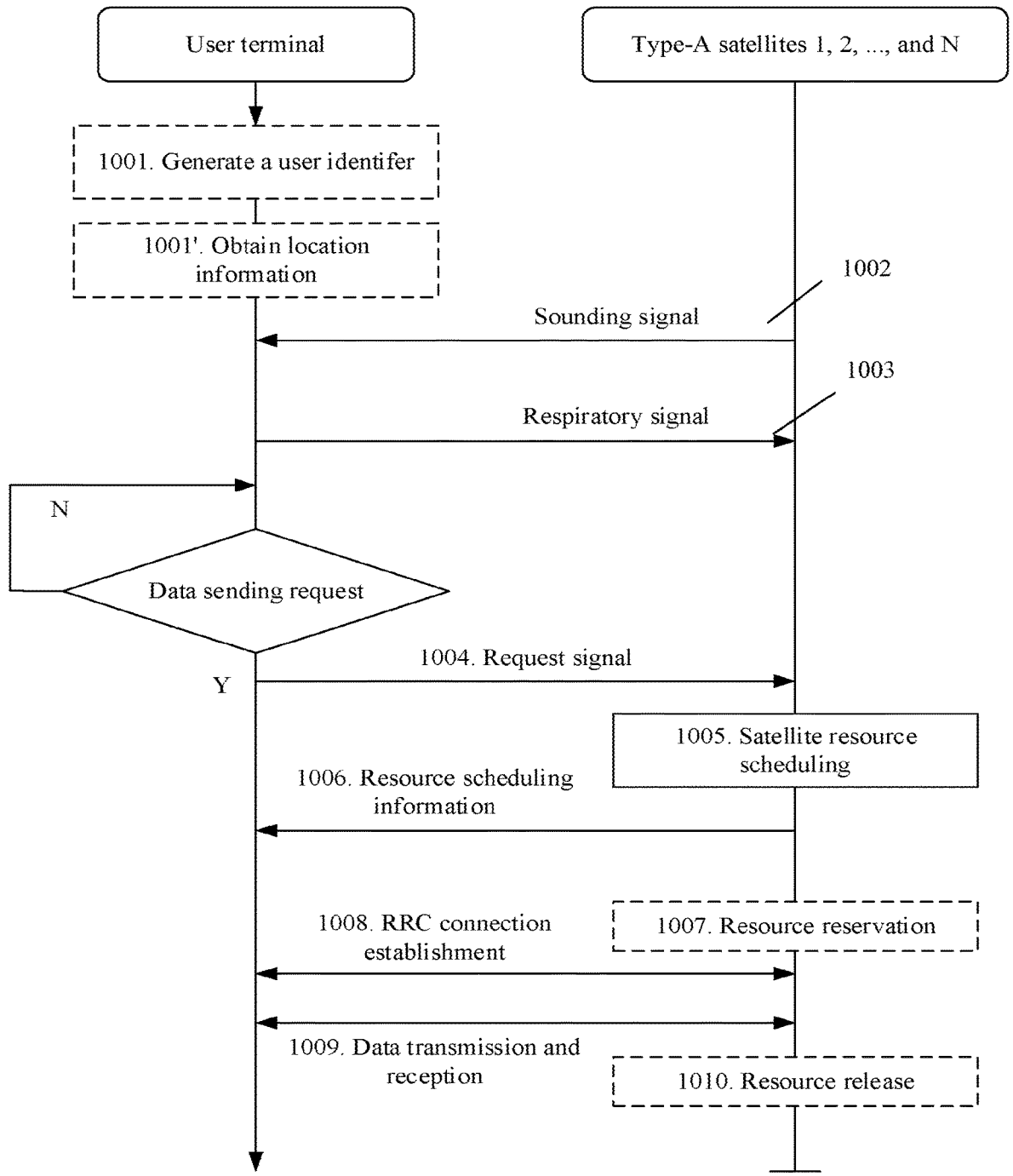
FIG. 10 is a schematic flowchart of a communication method in a satellite network according to an embodiment of the application.

FIG. 10 is a schematic flowchart of a communication method in a satellite network according to an embodiment of the application. The method may be used in the satellite communication network architecture as shown in FIG. 9. The method includes the following operations.

1001: The user terminal in a hyper cell generates a user identifier, and the user identifier in the hyper cell may be generated only when the user terminal accesses the hyper cell for the first time. If the user terminal has accessed the hyper cell and has a user identifier in the hyper cell, the operation of generating the user identifier may be omitted.

In an embodiment, operation 1001' is further included. The user terminal obtains location information of the user terminal. For a method for obtaining the user identifier and the location information, refer to operation 401 in the foregoing communication method in the satellite network. Details are not described herein again.

1002: The type-A satellite sends a sounding signal on a dedicated management channel, the user terminal receives the sounding signal sent by the type-A satellite, and the type-A satellite selects a corresponding physical resource to send a respiratory signal at a predetermined time or as required. For this operation, refer to operation 402 in the foregoing communication method in the satellite network. Details are not described herein again.

It should be noted that there is no necessary execution sequence between operations in operation 1001 (1001') and operation 1002. For details, refer to the solutions in the foregoing embodiments of the application. This is not limited in an embodiment of the application.

1003: The user terminal sends the respiratory signal, and the type-A satellite receives the respiratory signal. The type-A satellite shares, by an inter-satellite connection, detected information related to the user terminal with an entire satellite network, and updates the information about the user terminal in the hyper cell, where the information about the user terminal herein may include a priority of the user terminal served by each type-A satellite, and the like.

In an embodiment, the type-A satellite detects the respiratory signal in a periodic manner through system configuration or in an aperiodic manner through system scheduling. The type-A satellite in the networking updates content such as the identifier of the user terminal and the location information in the hyper cell based on the respiratory signal. The inter-satellite connection means that management information is sent and received between two adjacent type-A satellites, and the management information of the user terminal is shared in the entire type-A satellite network.

In an embodiment, the priority of the user terminal means that if there is a limited quantity of communication resources, a user with a high priority may preferentially obtain a communication service, and a user with a low priority can be allocated to resources only after the user with the high priority obtains the communication service.

1004: In an embodiment, when the user terminal has a communication service requirement, the user terminal sends a communication request signal on the management channel, and the type-A satellite receives the communication request signal.

1005: After the type-A satellite receives the communication request signal, the type-A satellite network determines through negotiation, with reference to the location information of the user terminal and ephemeris information of the satellite network, at least one type-A satellite and at least one beam that serve the user terminal in this communication.

The type-A satellite may periodically or aperiodically detect the communication request signal.

In an embodiment, the ephemeris information is information such as orbit information of the satellite, identity information, a communication capability of the satellite, a security capability, and the like of the satellite. All the foregoing information may be included in the ephemeris information for transmission. The information may be used as one of factors for determining the type-A satellite that serves the user terminal.

It should be noted that when the type-A satellite and the beam are determined, the type-A satellite network in the networking allocates the type-A satellite and the beam to perform a communication service with reference to the location information of the user terminal and the ephemeris information such as an orbit of the type-A satellite and a communication capability that can be provided. The beam in operation 1005 is a beam used by the type-A satellite for service data processing.

In an embodiment, the type-A satellites within a range in which a to-be-served user terminal is used as a center may be first sorted based on a time that can cover the user terminal; then the type-A satellites that do not have capabilities of serving the user terminal or whose service communication capabilities do not reach a predetermined level are removed; and the remaining satellites are sorted again based on the coverage time, and the type-A satellite ranked at the top is selected as the type-A satellite that serves the user terminal.

In another embodiment, the type-A satellites within a range in which a to-be-served user terminal is used as a center may be first sorted based on a time that can cover the user terminal; then the type-A satellites that have capabilities of serving the user terminal or whose service communication capabilities reach a predetermined level are selected; and the sorted type-A satellites are sorted again based on the coverage time, and the type-A satellite ranked at the top is selected as the type-A satellite that serves the user terminal.

1006: The type-A satellite sends, on the management channel, resource scheduling information to the user terminal, to indicate the user terminal to prepare for communication.

1007: In an embodiment, the user terminal performs data communication by using the allocated type-A satellite and beam, and the determined type-A satellite reserves resources for the user terminal.

1008: The user terminal establishes an RRC connection to the type-A satellite.

1009: The user terminal receives and sends communication service data to the type-A satellite.

1010: In an embodiment, when a serving satellite is switched, communication resources of an original type-A satellite that serves the user terminal are released.

In a communication process, the user terminal and the type-A satellite that is in the networking continuously perform operations 1002 to 1004 until the entire communication ends.

Figure 11:
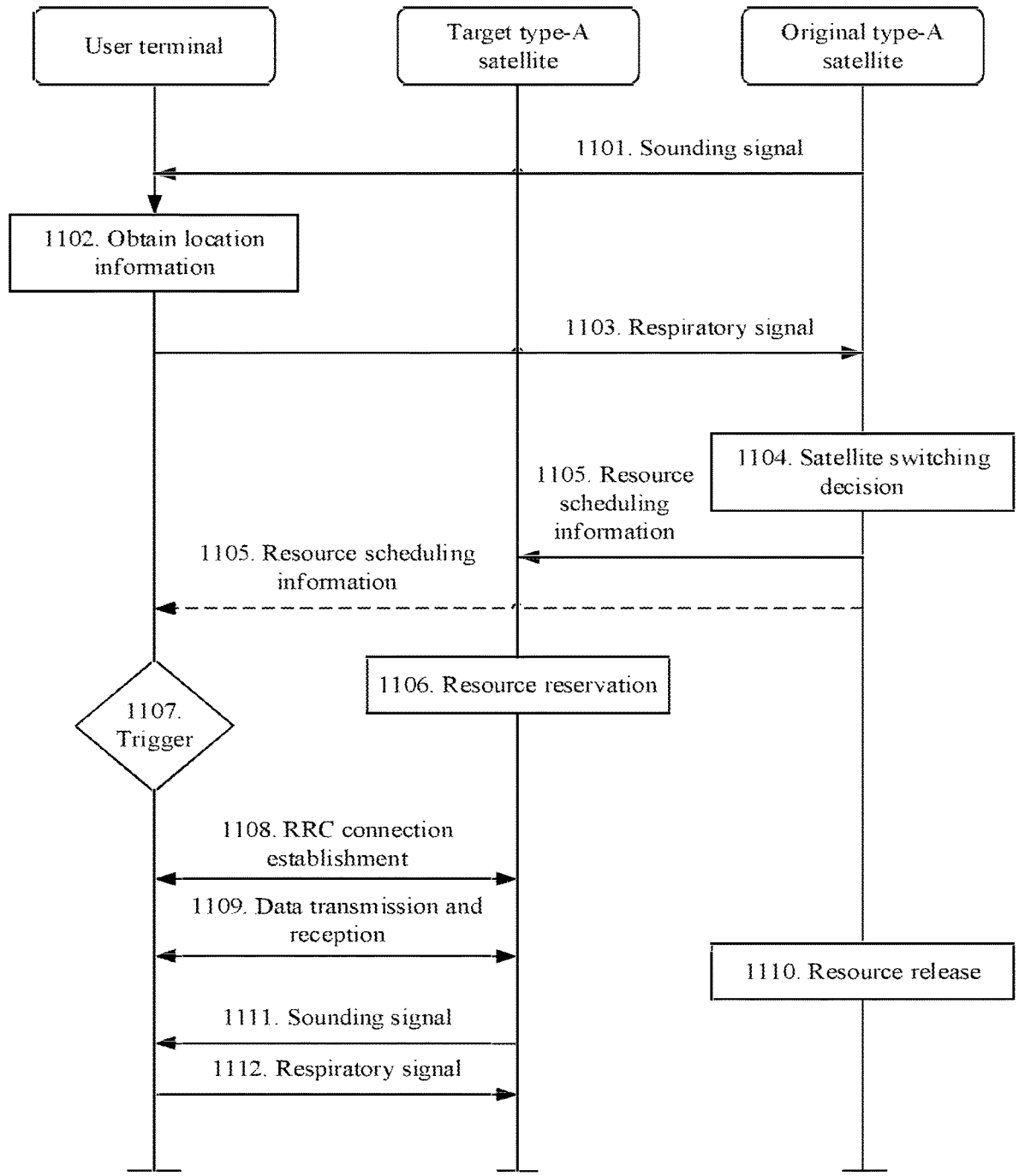
FIG. 11 is a schematic flowchart of a communication method for satellite switching in a satellite communication process according to one embodiment.

In an embodiment, the user terminal moves at a high speed across a hyper cell covered by different type-A satellites. FIG. 11 is a schematic flowchart of a communication method for satellite switching in a satellite communication process according to one embodiment.

A switching procedure includes the following operations.

1101: A type-A satellite sends a sounding signal to a user terminal, and the user terminal receives the sounding signal sent by the type-A satellite on an agreed management channel.

1102: The user terminal obtains location information of the user terminal.

1103: The user terminal sends a respiratory signal to the type-A satellite, and the type-A satellite detects the respiratory signal. The user terminal may periodically or aperiodically send the respiratory signal, to prove that the user terminal is still in a current hyper cell, and receive a communication service of a type-B satellite in the hyper cell, where the respiratory signal may carry information such as the user identifier and/or the location information.

In a service communication process, the type-A satellite periodically or aperiodically detects the respiratory signal, and updates content such as the user identifier and the location information of the user terminal in the hyper cell based on the respiratory signal.

1104: The type-A satellite performs switching decision. An original type-A satellite determines, based on the content such as the identifier of the user terminal and the location information in the hyper cell, whether the user terminal exceeds a coverage area of the type-A satellite. When a distance from the user terminal to an edge of the coverage area of the type-A satellite reaches a threshold or a service time of the type-A satellite reaches a threshold, the original type-A satellite determines, based on the method in operation 1004, a next target type-A satellite and a next beam that serve the user terminal for communication. The original type-A satellite network performs satellite switching decision based on the foregoing method.

1105: After the target type-A satellite and the beam that serve the user terminal are determined, the original type-A satellite notifies the target type-A satellite of resource scheduling information.

1106: The target type-A satellite reserve resources based on operation 1007.

1107: Then, the original type-A satellite or the target type-A satellite triggers the user terminal, and indicates the terminal to establish a connection to the target type-A satellite.

1108: The user terminal establishes an RRC connection to the target type-A satellite.

1109: The user terminal receives and sends communication service data to the target type-A satellite, and the target type-A satellite starts to be responsible for a communication service of the user terminal.

1110: Resources of the original type-A satellite are released.

1111: The user terminal starts to detect a sounding signal of the target type-A satellite.

1112: The user terminal continuously sends the respiratory signal to the target type-A satellite, to prove that the user terminal is located in a management range of a hyper cell of the target type-A satellite, and receives a service of the target type-A satellite.

In an embodiment, in operation 1105, the original type-A satellite may notify the target type-A satellite of a scheduling result, and the original type-A satellite may also notify the user terminal of the scheduling result; and the user terminal actively establishes the connection to the target type-A satellite and completes a subsequent operation.

Figure 12:
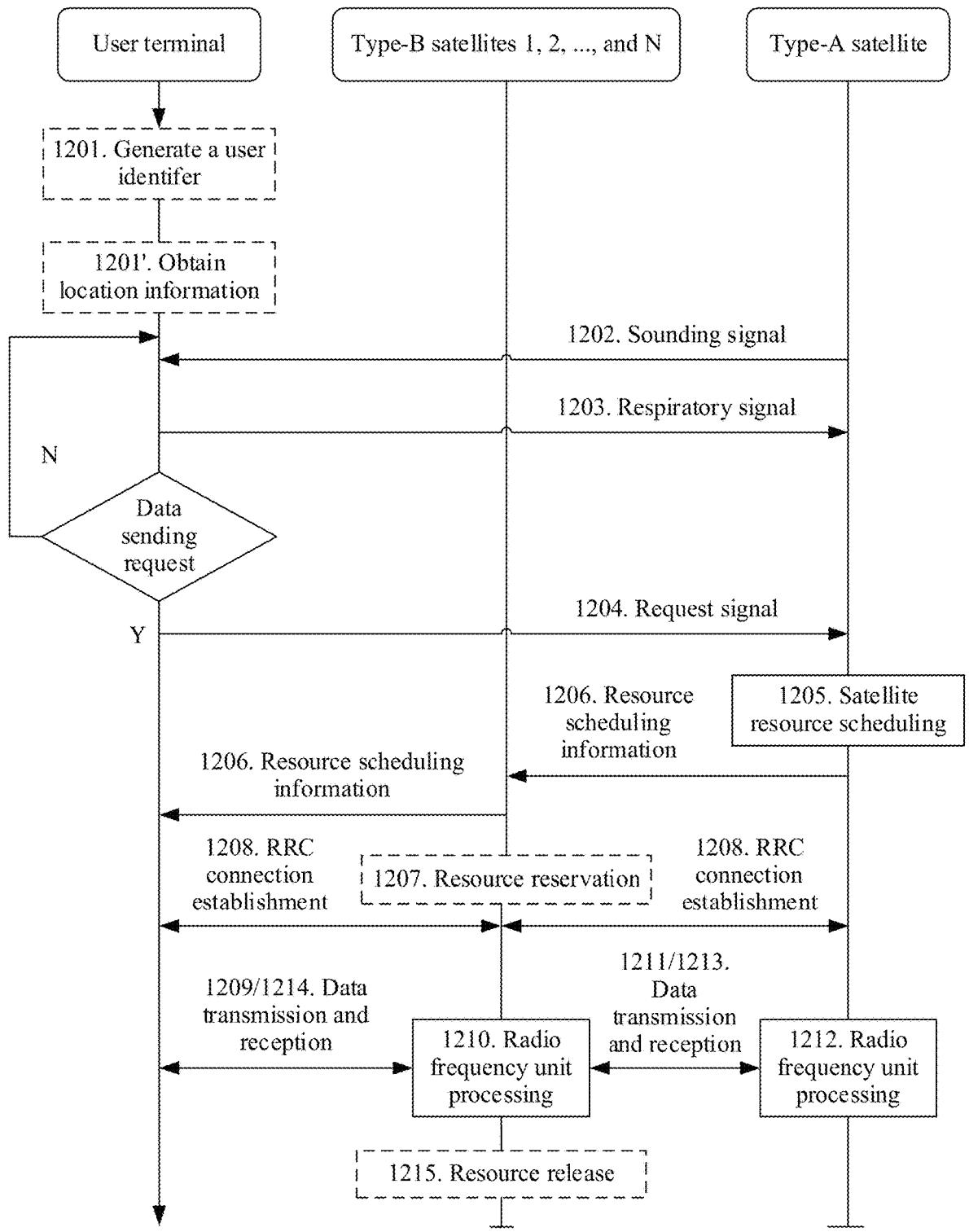
FIG. 12 is a schematic flowchart of a communication method in a satellite network according to an embodiment of the application.

FIG. 12 is a schematic flowchart of a communication method in a satellite network according to an embodiment of the application. The method is used in a satellite communication network architecture that includes a type-A satellite, a type-B satellite, and a user terminal. A radio frequency unit and a baseband unit that process management information are deployed on the type-A satellite, a baseband unit that processes communication service data is also deployed on the type-A satellite, and a radio frequency unit that processes communication service data is deployed on the type-B satellite. The method is used when a user terminal initially accesses a hyper cell. The method includes the following operations.

1201: The user terminal in a hyper cell generates a user identifier, and the user identifier in the hyper cell may be generated only when the user terminal accesses the hyper cell for the first time. If the user terminal has accessed the hyper cell and has a user identifier in the hyper cell, the operation of generating the user identifier may be omitted.

In an embodiment, the method may further include operation 1201' in which the user terminal obtains location information of the user terminal.

For a method for obtaining the user identifier and the location information, refer to operation 401 in the foregoing communication method in the satellite network. Details are not described herein again.

1202: The type-A satellite sends a sounding signal on a dedicated management channel, and the user terminal receives the sounding signal. For this operation, refer to operation 402 in the foregoing communication method in the satellite network. Details are not described herein again.

It should be noted that there is no necessary execution sequence between operations in operation 1201 (1201') and operation 1202. For details, refer to the solutions in the foregoing embodiments of the application. This is not limited in an embodiment of the application.

1203: The user terminal sends a respiratory signal, and the type-A satellite receives the respiratory signal, where the respiratory information carries the user identifier and/or the location information of the user terminal, and the type-A satellite updates content such as the user identifier and the location information of the user terminal in the hyper cell based on the respiratory signal. The user terminal may select an agreed physical resource to periodically or aperiodically send the respiratory signal. Correspondingly, the type-A satellite may detect the respiratory signal in a periodic manner through system configuration or in an aperiodic manner through system scheduling.

1204: In an embodiment, when the user terminal has a communication service requirement, the user terminal sends a communication request signal on the management channel, and the type-A satellite receives the communication request signal.

1205: The type-A satellite performs scheduling decision on a serving satellite, and after receiving the communication request signal, the type-A satellite determines, with reference to related content such as the location information of the user terminal and ephemeris information of a satellite network, at least one type-B satellite and at least one beam that serve the user terminal in this communication. For operation 1205, refer to operation 405 in the foregoing communication method in the satellite network. Details are not described herein again.

1206: The type-A satellite sends resource scheduling information to the corresponding type-B satellite and the user terminal through the management channel.

1207: The user terminal performs data communication by using the allocated type-B satellite and beam, and the determined type-B satellite reserves resources for the user terminal.

1208: The user terminal establishes an RRC connection to the type-B satellite, and the type-B satellite establishes an RRC connection to the type-A satellite that manages the type-B satellite.

1209: The user terminal sends communication service data to a target type-B satellite.

1210: After receiving the communication service data sent by the user terminal, the type-B satellite uses a deployed radio frequency unit that processes the communication service data to perform radio frequency signal processing on the data, to obtain first service data.

The first service data includes data obtained after the type-B satellite performs radio frequency signal processing on the communication service data from the user terminal.

1211: The type-B satellite sends the first service data to the type-A satellite that manages the type-B satellite.

1212: After the type-A satellite receives the first service data sent by the type-B satellite, the baseband unit that is deployed on the type-A satellite and that processes the communication service data processes the first service data, to obtain second service data.

The second service data includes data obtained after the type-A satellite performs baseband signal processing on the first service data from the type-B satellite.

1213: The type-A satellite sends the second service data back to the target type-B satellite.

1214: The target type-B satellite then sends the data to the user terminal.

1215: In an embodiment, when a serving satellite is switched, communication resources of an original type-B satellite that serves the user terminal are released.

In a communication process, the user terminal and the type-A satellite continuously perform operations 1202 to 1204 until the entire communication ends.

Figure 13:
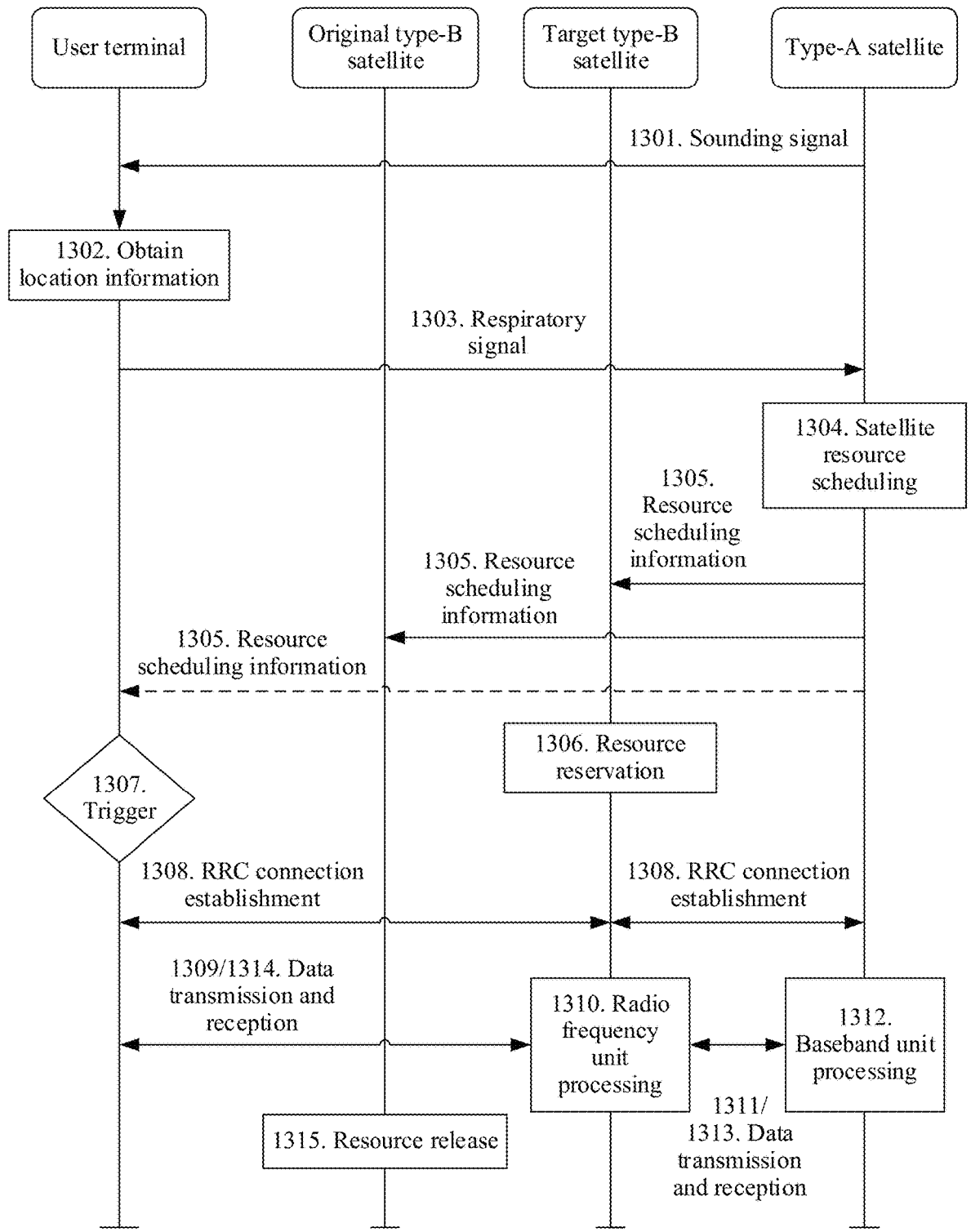
FIG. 13 is a schematic flowchart of a communication method for satellite switching in a satellite communication process according to one embodiment.

In an embodiment, the user terminal may encounter type-B satellite switching in a service communication process. FIG. 13 is a schematic flowchart of a communication method for satellite switching in a satellite communication process according to one embodiment. The process is roughly the same as the process in FIG. 5, and a main difference lies in that, in an embodiment, a baseband unit and a radio frequency unit that process communication service data are deployed in a distributed manner, and the service data can be processed only with the participation of a type-A satellite, thereby implementing satellite communication of a user terminal.

As shown in FIG. 13, a switching procedure includes the following operations.

1301: The type-A satellite sends a sounding signal to the user terminal, and the user terminal receives the sounding signal sent by the type-A satellite on an agreed management channel.

1302: The user terminal obtains location information of the user terminal.

1303: The user terminal sends a respiratory signal to the type-A satellite, and the type-A satellite detects the respiratory signal. The user terminal may periodically or aperiodically send the respiratory signal, to prove that the user terminal is still in a current hyper cell, and receive a communication service of a type-B satellite in the hyper cell, where the respiratory signal may carry information such as a user identifier and/or the location information.

In a service communication process, the type-A satellite periodically or aperiodically detects the respiratory signal, and updates content such as the user identifier and the location information of the user terminal in the hyper cell based on the respiratory signal.

1304: The type-A satellite performs switching decision. The type-A satellite determines, based on content such as the user identifier, the location information, and ephemeris information of a currently serving type-B satellite, whether the user terminal exceeds a coverage area of the satellite. When a distance from the user terminal to an edge of the coverage area of the type-B satellite reaches a threshold or a service time of the type-B satellite reaches a threshold, the type-A satellite determines, based on the method for determining the type-B satellite and the beam that serve the user terminal in operation 405, a next type-B satellite and a next beam that serve the user terminal; and the type-A satellite performs baseband satellite switching decision based on the foregoing method.

1305: After the type-A satellite determines the next type-B satellite and the beam that serve the user terminal, the type-A satellite notifies a target type-B satellite and an original type-B satellite of resource scheduling information.

1306: The target type-B satellite reserves resources for the user terminal.

1307: Then, the original type-B satellite or the target type-B satellite triggers the user terminal, and indicates the terminal to establish a connection to the target type-B satellite.

1308: The user terminal establishes an RRC connection to the type-B satellite, and the type-B satellite establishes an RRC connection to the type-A satellite that manages the type-B satellite.

1309: The user terminal sends communication service data to the target type-B satellite.

1310: The target type-B satellite performs radio frequency signal processing on the communication service data sent by the user terminal, to obtain first service data.

1311: The target type-B satellite sends the first service data obtained after the radio frequency signal processing is performed to the type-A satellite.

1312: A baseband unit that is deployed on the type-A satellite and that processes the communication service data processes the first service data, to obtain second service data.

1313: The second service data processed by the type-A satellite is sent back to the target type-B satellite.

1314: The target type-B satellite then sends the data to the user terminal, and the target type-B satellite starts to be responsible for a communication service of the user terminal.

1315: Resources of the original type-B satellite are released.

In an embodiment, in operation 1305, the type-A satellite notifies the target type-B satellite and the original type-B satellite of a scheduling result, and the type-A satellite may also notify the user terminal of the scheduling result; and the user terminal actively establishes the connection to the target type-B satellite and completes a subsequent operation.

With reference to FIG. 14 to FIG. 17, the following briefly describes a user terminal, a management satellite, and a system that are provided in the embodiments of the application and are configured to perform the methods or procedures in the embodiments described above. Content of the foregoing embodiments is applicable to the embodiments in FIG. 14 to FIG. 17. Therefore, details are not described again.

Figure 14:
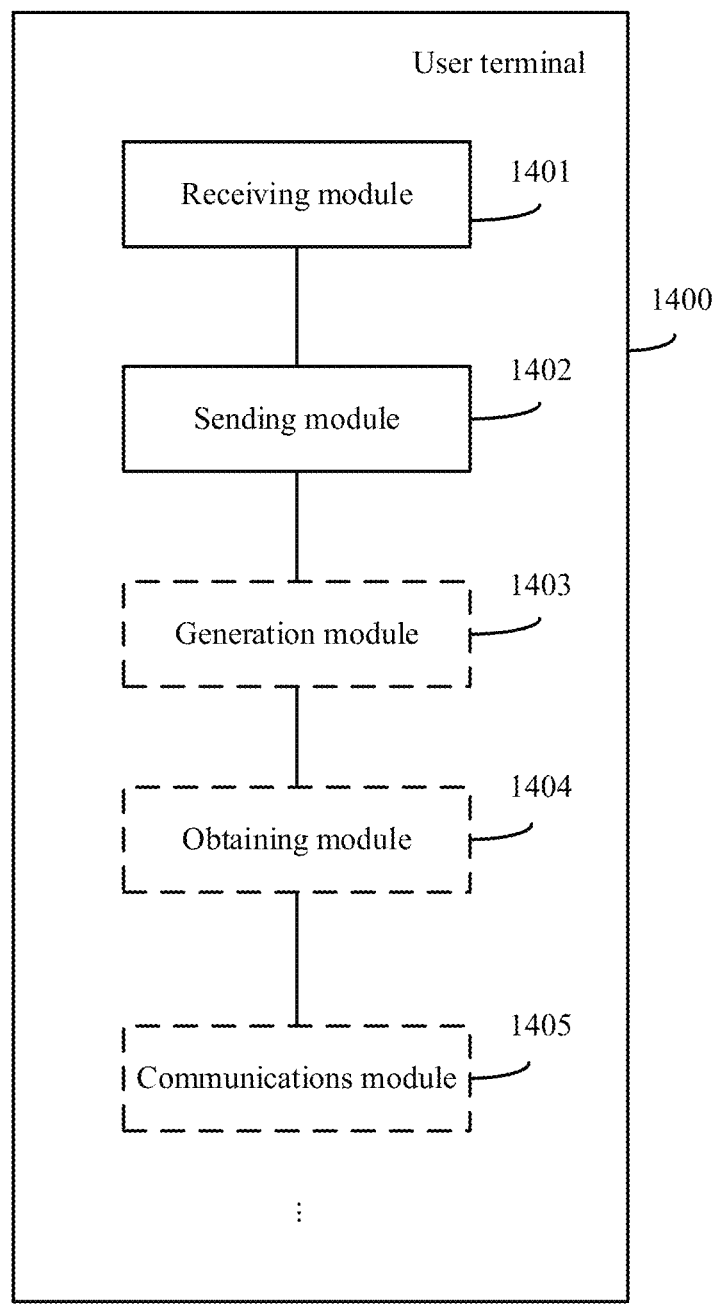
FIG. 14 is a schematic structural diagram of a user terminal 1400 according to an embodiment of the application.

FIG. 14 is a schematic structural diagram of a user terminal 1400 according to an embodiment of the application. The user terminal 1400 includes:

a receiving module 1401, configured to receive a sounding signal sent by a management satellite on a management channel, where the management satellite manages one or more serving satellites; and a sending module 1402, configured to send a respiratory signal to the management satellite, where the respiratory signal carries information about the user terminal, and the information about the user terminal is used to determine information about a serving satellite that serves the user terminal; and a generation module 1403, configured to generate a unique user identifier in a hyper cell, where the information about the user terminal includes the user identifier. The generation module is configured to generate the user identifier by using the hyper cell identifier and a device identifier of the user terminal.

In an embodiment, the receiving module 1402 is further configured to receive resource scheduling information sent by the management satellite, where the resource scheduling information includes the information about the serving satellite that serves the user terminal.

In an embodiment, the sending module 1402 is further configured to send a communication request signal to the management satellite.

In an embodiment, the user terminal further includes an obtaining module 1404, configured to obtain location information of the user terminal, where the information about the user terminal includes the location information.

In an embodiment, the user terminal further includes a communications module 1405, configured to establish a radio resource control (RRC) connection to the serving satellite, to implement service communication between the user terminal and the serving satellite.

Figure 15:
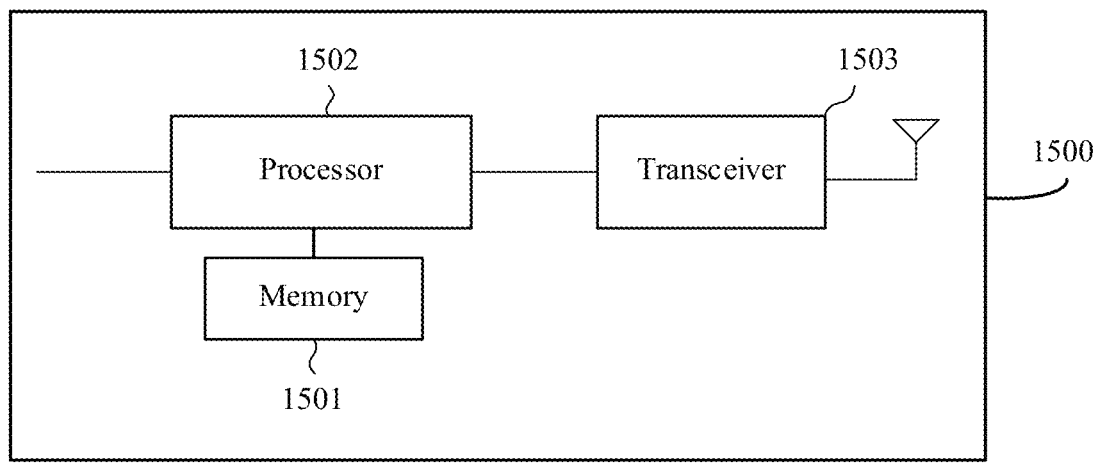
FIG. 15 is a schematic structural diagram of a user terminal 1500 according to an embodiment of the application.

FIG. 15 is a schematic structural diagram of a user terminal 1500 according to an embodiment of the application. The user terminal 1500 includes:

a memory 1501, configured to store computer program instructions; and a processor 1502, configured to execute the program stored in the memory.

When the program is executed, the processor executes the computer program instructions stored in the memory, so that the user terminal implements the satellite communication method related to the user terminal in any one of the foregoing embodiments.

In an embodiment, the user terminal 1500 further includes a transceiver 1503. When the program is executed, the processor executes the computer program instructions stored in the memory, so that the transceiver of the user terminal implements the receiving and sending operations in the satellite communication method related to the user terminal in any one of the foregoing embodiments.

Figure 16:
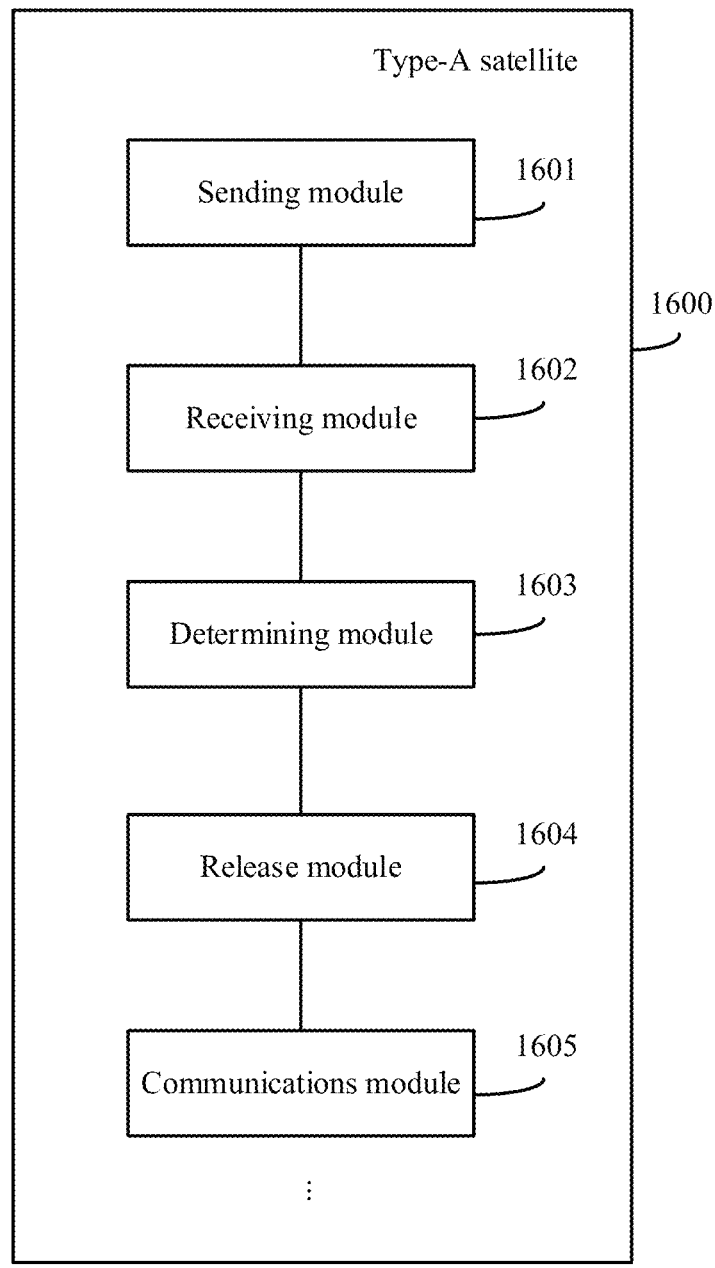
FIG. 16 is a schematic structural diagram of a management satellite (a type-A satellite) 1600 according to an embodiment of the application.

FIG. 16 is a schematic structural diagram of a management satellite (a type-A satellite) 1600 according to an embodiment of the application. The management satellite 1600 includes:
- a sending module 1601, configured to send, on a management channel, a sounding signal to a user terminal, where the management satellite manages one or more serving satellites; and
- a receiving module 1602, configured to receive a respiratory signal sent by the user terminal, where the respiratory signal carries information about the user terminal, and the information about the user terminal is used to determine information about a serving satellite that serves the user terminal.

In an embodiment, the management satellite 1600 further includes a determining module 1603, configured to determine resource scheduling information based on the information about the user terminal, where the resource scheduling information includes the information about the serving satellite that serves the user terminal.

In an embodiment, the receiving module 1602 is further configured to receive the resource scheduling information sent by a ground station.

In an embodiment, the sending module 1601 is further configured to send the resource scheduling information to the serving satellite; send the resource scheduling information to a target serving satellite and an original serving satellite; send the resource scheduling information to the user terminal; or send the resource scheduling information to a target management satellite.

In an embodiment, the sending module 1601 is further configured to send, to the ground station, the respiratory signal received from the user terminal.

In an embodiment, the receiving module 1602 is further configured to receive first service data sent by the serving satellite, where the first service data includes data obtained after the serving satellite performs radio frequency signal processing on communication data from the user terminal.

In an embodiment, the sending module 1601 is further configured to send a second service data to the serving satellite, where the second service data includes data obtained after the management satellite performs baseband signal processing on the first service data.

In an embodiment, the management satellite further includes a release module 1604, where the release module is configured to release resources after sending a scheduling result to the target management satellite.

In an embodiment, the sending module 1601 is further configured to: after the management satellite receives a communication request signal sent by the user terminal, send the communication request signal to the ground station for processing.

In an embodiment, the management satellite further includes a communications module 1605, configured to establish a radio resource control (RRC) connection to the serving satellite.

Figure 17:
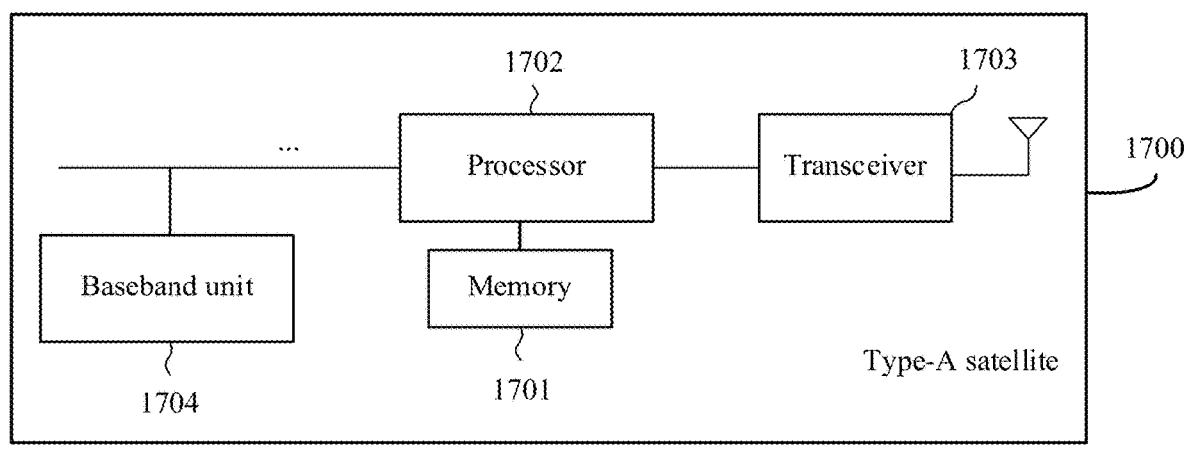
FIG. 17 is a schematic structural diagram of a management satellite (a type-A satellite) 1700 according to an embodiment of the application.

FIG. 17 is a schematic structural diagram of a management satellite (a type-A satellite) 1700 according to an embodiment of the application. The management satellite 1700 includes:
- a memory 1701, configured to store computer program instructions; and
- a processor 1702, configured to execute the program stored in the memory.

When the program is executed, the processor executes the computer program instructions stored in the memory, so that the type-A satellite implements the satellite communication method related to the type-A satellite in any one of the foregoing embodiments.

In an embodiment, the management satellite further includes a transceiver 1703. When the program is executed, the processor executes the computer program instructions stored in the memory, so that the transceiver of the management satellite implements the receiving and sending operations in the satellite communication method related to the management satellite in any one of the foregoing embodiments.

In an embodiment the type-A satellite 1700 may further include a baseband unit 1704, configured to perform baseband signal processing on the first service data in any one of the foregoing embodiments.

An embodiment of the application further provides a computer-readable medium. The computer-readable medium stores computer program instructions, and when the computer program instructions are executed by a computer, the method in any one of the foregoing embodiments is implemented.

An embodiment of the application further provides a computer program product. When the computer program product is executed by a computer, the method in any one of the foregoing embodiments is implemented.

An embodiment of the application further provides a satellite communication system, including a user terminal and a type-A satellite. For example, the user terminal may be the user terminal 1400 provided in the foregoing embodiment, and the type-A satellite may be the type-A satellite 1600 provided in the foregoing embodiment. Alternatively, the user terminal may be the user terminal 1500 provided in the foregoing embodiment, and the type-A satellite may be the type-A satellite 1700 provided in the foregoing embodiment.

An embodiment of the application further provides a system chip. The system chip includes a processing unit and a communications unit. The processing unit may be, for example, a processor. The communications unit may be, for example, an input/output interface, a pin, a circuit, or the like. The processing unit may execute computer instructions, so that a chip in a communications apparatus performs any one of the methods provided in the foregoing embodiments of the application.

In the examples described in the embodiments of the application, units and method processes may be implemented by electronic hardware or a combination of computer software and electronic hardware. Whether the functions are performed by hardware or software depends on particular applications and design constraints of the technical solutions. One of ordinary skill in the art can implement the described functions by using different methods for each application.

In the several embodiments provided in the application, it should be understood that the disclosed apparatus and method may be implemented in other manners. The described apparatus embodiments are merely examples. For example, division into the units is merely logical function division and may be other division in actual implementation. For example, a plurality of units or components may be combined or may be integrated into another system. Some operations in the method may be ignored or not performed. In addition, couplings or direct couplings or communication connections between the units may be implemented by using some interfaces, and these interfaces may be implemented in electronic, mechanical, or other forms.

The units described as separate parts may or may not be physically separate, and may be located in one location or may be distributed on a plurality of network units. In addition, the functional units in the embodiments of the application may be integrated into one processing unit, or each of the units may exist alone physically, or two or more units may be integrated into one unit.

All or some of the foregoing embodiments may be implemented by software, hardware, firmware, or any combination thereof. When software is used to for implementation, all or some of the embodiments may be implemented in a form of a computer program product. The computer program product includes one or more computer instructions. When the computer program instructions are loaded and executed on a computer, all or some of the procedures or the functions according to the embodiments of the disclosure are generated. The computer may be a general-purpose computer, a dedicated computer, a computer network, or another programmable apparatus. The computer instructions may be stored in a computer-readable storage medium, or may be transmitted by using the computer-readable storage medium. The computer instructions may be transmitted from one website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape, a USB flash drive, a ROM, a RAM), an optical medium (for example, a CD or DVD), a semiconductor medium (for example, a solid-state drive (SSD)), or the like.

The foregoing embodiments are merely intended to describe the technical solutions of the disclosure, but not to limit the disclosure. Although the disclosure is described in detail with reference to the foregoing embodiments, one of ordinary skill in the art should understand that they may still make modifications to the technical solutions described in the foregoing embodiments or make equivalent replacements to some technical features thereof, without departing from the scope of the technical solutions of the embodiments of the disclosure. Although the application is described with reference to the embodiments, in a procedure of implementing the application that claims protection, one of ordinary skill in the art may understand and implement another variation of the disclosed embodiments by viewing the accompanying drawings, disclosed content, and the appended claims. In the claims, "comprise" (comprising) does not exclude another component or another operation, and "a" or "one" does not exclude a case of plurality. A single processor or another unit may implement several functions enumerated in the claims. Some measures are recorded in dependent claims that are different from each other, but this does not mean that these measures cannot be combined to produce a great effect.

Although the application is described with reference to features and the embodiments thereof, it is clear that various modifications and combinations may be made to them without departing from the spirit and scope of the application. Correspondingly, the specification and accompanying drawings are merely example description of the application defined by the appended claims, and is considered as any of or all modifications, variations, combinations or equivalents that cover the scope of the application. It is clear that one of ordinary skill in the art can make various modifications and variations to the application without departing from the spirit and scope of the application. The application is intended to cover these modifications and variations of the application provided that they fall within the scope of protection defined by the following claims and their equivalent technologies.

What is claimed is:

1. A satellite communication method comprising:
receiving, by a user terminal on a management channel, a sounding signal sent by a management satellite, wherein the management satellite manages one or more serving satellites; and
sending, by the user terminal, a respiratory signal to the management satellite, wherein the respiratory signal carries information about the user terminal, and the information about the user terminal is for determining information about a serving satellite that serves the user terminal.

2. The method according to claim 1, wherein a set of areas covered by the one or more serving satellites managed by the management satellite form a hyper cell; areas covered by several management beams that are transmitted by the management satellite form a hyper cell; a set of areas covered by a plurality of management satellites form a hyper cell; or a set of areas covered by a plurality of serving satellites managed by a plurality of management satellites form a hyper cell.

3. The method according to claim 2, wherein the user terminal has a unique user identifier in the hyper cell, and the information about the user terminal comprises the user identifier.

4. The method according to claim 3, wherein the hyper cell has a hyper cell identifier, and the user identifier is determined based on the hyper cell identifier and a device identifier of the user terminal.

5. The method according to claim 1, further comprising:
receiving, by the user terminal, resource scheduling information sent by the management satellite, wherein the resource scheduling information comprises the information about the serving satellite that serves the user terminal.

6. The method according to claim 1, further comprising:
after sending the respiratory signal, sending, by the user terminal, a communication request signal to the management satellite.

7. The method according to claim 1, comprising:
obtaining, by the user terminal, location information of the user terminal, wherein the information about the user terminal includes the location information.

8. The method according to claim 1, further comprising:
after sending the respiratory signal to the management satellite, establishing, by the user terminal, a radio resource control connection to the serving satellite.

9. A satellite communication method comprising:
sending, by a management satellite on a management channel, a sounding signal to a user terminal, wherein the management satellite manages one or more serving satellites; and
receiving, by the management satellite, a respiratory signal sent by the user terminal, wherein the respiratory signal carries information about the user terminal, and the information about the user terminal is for determining information about a serving satellite that serves the user terminal.

10. The method according to claim 9, wherein a set of areas covered by the one or more serving satellites managed by the management satellite form a hyper cell; areas covered by a plurality of management beams that are transmitted by the management satellite form a hyper cell; a set of areas covered by a plurality of management satellites form a hyper cell; or a set of areas covered by a plurality of serving satellites managed by a plurality of management satellites form a hyper cell.

11. The method according to claim 10, wherein the user terminal has a unique user identifier in the hyper cell, and the information about the user terminal comprises the user identifier.

12. The method according to claim 11, wherein the hyper cell has a hyper cell identifier, and the user identifier is determined based on the hyper cell identifier and a device identifier of the user terminal.

13. The method according to claim 9, further comprising: determining, by the management satellite, resource scheduling information based on the information about the user terminal, wherein the resource scheduling information comprises the information about the serving satellite that serves the user terminal.

14. A user terminal comprising:
a memory; and a processor coupled to the memory, wherein the processor is configured to:
receive, on a management channel, a sounding signal sent by a management satellite, wherein the management satellite manages one or more serving satellites; and
send, a respiratory signal to the management satellite, wherein the respiratory signal carries information about the user terminal, and the information about the user terminal is for determining information about a serving satellite that serves the user terminal.

15. The user terminal according to claim 14, wherein a set of areas covered by the one or more serving satellites managed by the management satellite form a hyper cell; areas covered by several management beams that are transmitted by the management satellite form a hyper cell; a set of areas covered by a plurality of management satellites form a hyper cell; or a set of areas covered by a plurality of serving satellites managed by a plurality of management satellites form a hyper cell.

16. The user terminal according to claim 15, wherein the user terminal has a unique user identifier in the hyper cell, and the information about the user terminal comprises the user identifier.

17. The user terminal according to claim 16, wherein the hyper cell has a hyper cell identifier, and the user identifier is determined based on the hyper cell identifier and a device identifier of the user terminal.

18. The user terminal according to claim 14, wherein the processor is further configured to:
receive resource scheduling information sent by the management satellite, wherein the resource scheduling information comprises the information about the serving satellite that serves the user terminal.

19. The user terminal according to claim 14, wherein the processor is further configured to:
send a communication request signal to the management satellite.

20. The user terminal according to claim 14, wherein the processor is further configured to:
obtain location information of the user terminal, wherein the information about the user terminal includes the location information.

* * * * *